US008989896B2

(12) United States Patent
Brown

(10) Patent No.: US 8,989,896 B2
(45) Date of Patent: Mar. 24, 2015

(54) HIGH EFFICIENCY AUTOMATED PHARMACEUTICAL DISPENSER

(76) Inventor: Arthur E. Brown, Huntington Beach, CA (US)

( * ) Notice: Subject to any disclaimer, the term of this patent is extended or adjusted under 35 U.S.C. 154(b) by 44 days.

(21) Appl. No.: 13/454,368

(22) Filed: Apr. 24, 2012

(65) Prior Publication Data

US 2013/0282163 A1 Oct. 24, 2013

(51) Int. Cl.

*G06F 7/00* (2006.01)
*G07F 11/00* (2006.01)
*B65D 83/04* (2006.01)
*G07F 17/00* (2006.01)

(52) U.S. Cl.

CPC ........ *B65D 83/0463* (2013.01); *G07F 17/0092* (2013.01)
USPC .......................................... 700/242; 700/243

(58) Field of Classification Search

CPC ........................ B65D 83/0463; B65D 83/0472
USPC .................................................. 700/242–243
See application file for complete search history.

(56) References Cited

U.S. PATENT DOCUMENTS 4,094,129 A * 6/1978 List .................................. 53/54
4,546,901 A 10/1985 Buttarazzi
5,460,471 A * 10/1995 Connor et al. ................ 414/412
5,522,525 A * 6/1996 McLaughlin et al. ............ 221/4
5,918,445 A * 7/1999 Tisma et al. .................... 53/544
6,601,729 B1 * 8/2003 Papp .............................. 221/25
7,264,136 B2 * 9/2007 Willoughby et al. ............. 221/3
7,857,161 B2 * 12/2010 Pinney et al. ................... 221/10
7,934,355 B2 * 5/2011 Strub et al. ........................ 53/55
7,963,201 B2 * 6/2011 Willoughby et al. ........... 83/210
8,019,471 B2 * 9/2011 Bogash et al. ................ 700/242
8,036,773 B2 10/2011 Braun et al.
8,424,274 B2 * 4/2013 Aylward et al. ................. 53/473
8,521,327 B2 * 8/2013 Pinney et al. ................. 700/242
2003/0005800 A1 * 1/2003 Czarnek et al. .................... 83/24
2003/0102324 A1 * 6/2003 Illyes .............................. 221/25
2004/0158350 A1 * 8/2004 Ostergaard et al. ........... 700/231
2005/0049747 A1 * 3/2005 Willoughby et al. ......... 700/232
2005/0240305 A1 10/2005 Bogash et al.
2008/0308102 A1 * 12/2008 Davies et al. ............ 128/203.15
2010/0100232 A1 * 4/2010 Ishiwatari et al. ............ 700/225
2010/0174552 A1 7/2010 Hawkes et al.
2010/0176145 A1 * 7/2010 Hawkes et al. ................. 221/79
2012/0083666 A1 * 4/2012 Waugh et al. ................. 600/300
2012/0145585 A1 6/2012 Doyle et al.

* cited by examiner

*Primary Examiner* — Michael K Collins
(74) *Attorney, Agent, or Firm* — Buchalter Nemer; Kari L. Barnes

(57) ABSTRACT

A system, method and corresponding apparatus are provided for packaging, storing, tracking, and dispensing pharmaceuticals in unit doses in a highly efficient manner. In particular, a method of packaging pharmaceuticals within a ribbon having a plurality of adjacent segments each containing a unit dose of a pharmaceutical and having associated data indicia for efficient and uniform transport, tracking, storage and dispensing is provided. Pharmaceuticals are loaded into an automated dispenser that is networked with computers for accepting prescriptions and dispensing pharmaceutical accordingly.

11 Claims, 17 Drawing Sheets

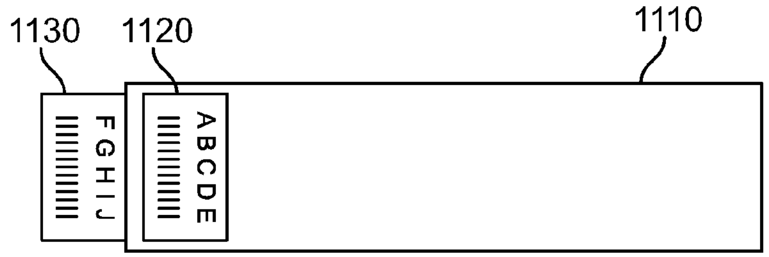
FIG. 11A
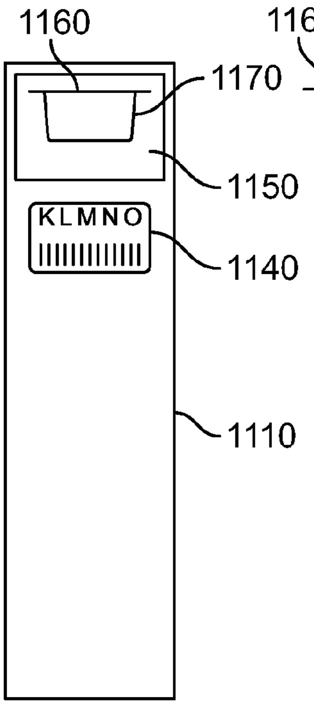
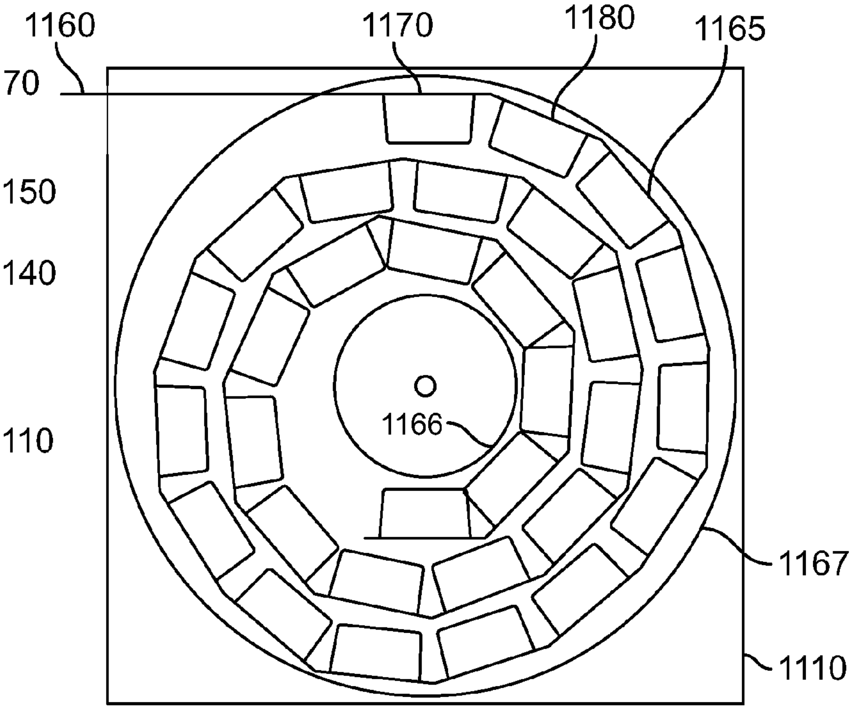
FIG. 11B
FIG. 11C

HIGH EFFICIENCY AUTOMATED PHARMACEUTICAL DISPENSER

FIELD OF INVENTION

This invention relates to automated pharmaceutical dispenser devices such as those that dispense a plurality of different drugs with varying doses used in hospitals, pharmacies and home health care facilities.

BACKGROUND

The dispensing of pharmaceuticals in hospitals, pharmacies, home healthcare, assisted living and similar facilities is a critical aspect of patient care. Pharmaceuticals are manufactured by numerous drug companies, most using different types of packaging, or packaging that is not uniform in size, drug quantity, labeling, or dosage. These packages can be syringes, ampules, vials, oral suspensions, tubes, jars, blister packs in single or multiple dose sheets, and many bottles of various sizes and shapes. The lack of standardization results in confusion for medical professionals regarding the delivery proper dose and medication, and it is known to result in a large number of adverse drug reactions caused by errors in the stocking, storage and delivery of prescribed medication.

Historically, in a large multi-patient environment, like hospitals that can have hundreds of beds, prescriptions are written by doctors; the prescription is physically or electronically presented to a hospital pharmacy; the pharmacy picks and packs the medicine for physical transfer to a cart or tray for transfer to nurses for delivery to and consumption by patients in their rooms. Nurses are usually responsible for multiple patients located in different rooms or locations within the hospital. Each step in the delivery chain opens opportunities for mistakes in giving patients an improper dosage or improper medication. In reading poor hand writing or inverting numbers on a script, pharmacists may accidently provide the wrong dosage or drug for delivery to a patient. Errors may also occur during transport to the patient's room or during the administration of the drug by nurses. These errors result in many serious or fatal adverse drug reactions every year and cost our health care system many billions in excess costs annually.

Attempts to improve existing packaging, storage, script writing and delivery systems and methods have been made. Systems are known with automated computerized script writing, cross referenced against electronic digital patient medical record, automated storage and dispensing. U.S. Pat. No. 6,757,898 discloses an electronic tracking and patient cross checking systems that is a significant improvement over manual systems. Doctors can now place scripts at a patient's bedside electronically through tablet computer and smart phones that are networked to interface directly with patient records and pharmacies. RFID and barcode systems are known that provide significant improvements in identifying and tracking drug type and dosage as the medication flows from script to patient. Further advances have been made with inventory management, tracking and control, reordering and stock adjustment systems. The security of inventory has also been improved by providing user authorization and authentication with delivery confirmation systems that allow for only dispensing drugs to authorized individuals and tracking the delivery of the dose until confirmation of delivery is provided.

Some attempts have been made to establish standardization in bar coding. 21 CFR 201.25 sets out guidelines for the pharmaceutical industry with respect to bar code formats and requirement for certain types of data. However, even with these advancements, there continue to be deficiency with these systems. Because there are no established standards for packaging, handling, tracking, dispensing and delivery of drugs in institutional environments, there remain significant inefficiencies, errors and limitations with existing designs. There is also a significant lack of standardization in the nature and structure of data that is captured and used in managing these functions. Automated dispensing machines have a number of limitations because they are generally designed to handle a variety of package designs or they require a significant amount of manual effort to stock or restock. Current state of the art automated dispensers, in order to handle a variety of medications, also require the manual preparation of individual unit doses of medication so that automated systems can accommodate the package for automated processing. Unit doses must be physically separated and placed in individual bin locations or canisters within the automated dispenser.

There are also limitations with respect to inventory monitoring and control of inventory in current pharmaceutical dispensers. In existing systems multiple individuals may have a key or access to secured areas or access point where medication is stored and inventoried. This leaves inventory vulnerable to unauthorized removal or theft.

Additionally, many of the known systems are very inefficient in both the unit dose package storage density and in the process of stocking and restocking of pharmaceuticals. In one known system, the McKesson Automation, Inc. system disclosed in U.S. Pat. No. 8,036,773 which is fully incorporated herein by reference, the system is designed to hold unit dose packages of various sizes. However, the McKesson system requires that each unit dose package be individualized or separated from multipack packages and that each separated unit dose package be place in individual carriers in a horizontal plane. The separation of the individual unit dose package is a manual process and requires a significant amount of physical labor to separate and load individual unit dose packages or to otherwise manipulate the unit dose packages to allow accommodation of different package sizes by the system. Alternatively, the user must purchase a standalone separating machine for the purpose of separating unit dose packages, which adds significant cost.

Because the system disclosed in U.S. Pat. No. 8,036,773 requires that each individual unit dose package be loaded into a carrier and then multiple carriers are stacked into a storage apparatus, there is a significant amount of unutilized space within the system and the unit dose package density is extremely low, requiring constant manual stocking as described above. Each time the system is stocked there is opportunity for error, and cost is added through manual processing. The loading or stocking procedure is just as lengthy and requires as much operator time as does the dispensing.

U.S. Pat. No. 8,090,472 issued to Schifman et al discloses an automated medication dispensing apparatus. This dispenser is similar to the dispenser disclosed in U.S. Pat. No. 8,036,773 in that it uses multiple pharmaceutical storage bins with multiple compartments for holding unit dose packages. The storage bins are stacked and each has an assigned location within a cabinet or enclosure. A robotic arm selects a pharmaceutical by selecting the proper bin location and moving the robotic arm to the bin location to extract the pharmaceutical stored at that location. The same limitations apply, in that there is low storage density, high manual processing and associated increase in error rates. The Schifman dispenser does improve security by including a camera for capturing still or video images of users accessing the apparatus.

Pharmaceutical dispensers have also improved by allowing digital communication with computer networks. Many healthcare facilities use integrated medical records management software to assist in patient care and to efficiently make available to clinicians patient information. Doctors can enter prescriptions into mobile computer devices such as tablets and smart phones. These wireless devices can be networked to centralized servers or cloud based databases that can interface with automated pharmaceutical dispensing systems. U.S. Pat. No. 8,090,471 discloses at a conceptual level such a system. These software applications have significantly improved the efficiency of the overall drug delivery process in healthcare facilities by reducing or eliminating mistake in script writing, patient identification. Software is also known for assisting in the management of inventory and access authorization in the automated pharmaceutical dispenser systems. However, these systems cannot improve efficiencies based on the lack of standardization or the limitations of the underlying automated dispenser design.

Personal Automated Dispensers

As the causes of mortality have shifted over the past one hundred years from acute infectious disease to chronic disease such as cardiovascular disease, cancer, diabetes and other age related diseases, pharmaceutical and biotech companies have developed a plethora of treatments that can be self-administered by patients without hospitalization and only minimal physician oversight. Patients with chronic ailments may often have multiple drugs that are taken at various times during the day. As lifespans increase and populations age, the challenge of managing medication schedules becomes more difficult and for some require assistance. Failure to maintain ones medication schedule can create serious medical problems for the patient. Additionally, some patients may have multiple prescriptions and can be confused about which drug relates to the appropriate schedule of administration, resulting in taking drug A on schedule intended for drug B. Additional problems exist with these patients simply failing to take their medication.

A number of personal automated medical dispensing devices are known. E-pill, LLC (www.epill.com/dispenser.html) manufactures a full line of personal dispensers having many of the features of larger systems but scaled to individual users. Many systems are microcontroller based and can have sophisticated user interfaces that allow users to set a number of system functions and features. A key feature of personal dispensers is a medication administration scheduling feature that provides notification to the user or healthcare providers of the time to take medication. Notification can be done via audible indicator, light flash, or wireless communication to a third person when medication is not removed from the dispenser at the appointed time. Although personal automated medical dispensers have improved, many of the same limitations existing with automated dispensers used in institutional venues carry over to personal automated medication dispensers, with some additional limitations. Much of the stocking procedure for personal automated dispensers is carried out manually, resulting in a system that is prone to error. Because of the smaller size of personal drug dispensers, restocking is required more often than larger automated systems, providing for even more opportunity for error. Additionally, many patients may be impaired either physically or cognitively and thus are incapable of properly stocking the dispenser and requiring assistance from a medical professional or family member for restocking. There are similar applications in the retail pharmacy, so called lights out order fulfillment and mail order facilities.

SUMMARY OF THE INVENTION

In view of the foregoing background, the present invention overcomes the limitations of the prior art by providing for a high efficiency automated pharmaceutical packaging method and dispensing systems for hospital, pharmacy, residential and home healthcare facilities.

In one aspect of the current invention, a method is disclosed that provides for ribbon segment packaging of pharmaceutical unit doses in a high-density manner for processing in high efficiency automated pharmaceutical dispensing systems. The invention consists of a means of packaging pharmaceuticals at the point of manufacture or post manufacturing prior to delivery to distribution. Pharmaceuticals are packaged in bands, tapes or ribbons of packaging material within a desirable width that can be wound about a reel or placed in a conduit for easy feeding of the ribbon into a dispenser. This packaging allows for the automated and uniform transport, tracking, storage and dispensing in a highly efficient manner. The packaging is two strips of layered ribbon material with pharmaceuticals packaged between the two bound layers. The bound ribbon with the captured unit dose is wound about a reel with a center core that may incorporate generally circular side supports of such size and configuration as to create an overall package with integrity onto which a continuous ribbon or length of prepackaged drugs can be wound.

The ribbon packaging consists of individually sealed segments with each segment having a cavity, and each cavity containing a single unit dose of a drug or pharmaceutical compound. The ribbon segment can also contain individual containers such as a vile, tube, or syringe or in itself being a container for a liquid or gel containing unit doses. Each ribbon segment is sequentially positioned on the ribbon so that there is only one dose per segment within the width of the ribbon package for each unit length, but multiple essentially identical segment lengths sequentially and uniformly spaced on the ribbon. Each side of individual ribbon sections may contain encoded data indicative of relevant information regarding the substance contain, dose, lot or manufacturer's date code, national drug code information, manufacturer's information, chain of custody, etc. The data can be essentially any type of data, and it can be encoded in a variety of know means, including single or multidimensional bar code. The data can be read as the ribbon segment passes over a reader to compare against the script to assure the proper medication is provided.

Each ribbon reel may be contained in a sealed conduit, cassette or cartridge for easy warehousing, transportation, storage and placement within the dispensing system, and to prevent contamination of the packaged pharmaceutical. Each can also be marked for identification using for example barcodes for type, batch and other data. The cartridge is formed from ridged support panels enclosing a ribbon reel. Standardized packaging may also be a container or box into which a fan-folded ribbon may be placed. In another alternative, each ribbon strip may be fed into a tube or similar conduit restraint system that allows for convenient insertion into the dispenser.

The ribbon segments may have holes punched on either or both linear edges to allow the ribbon to be pulled or drawn from the reel. The ribbon can be of essentially any width and length depending on the dispensing application and the pharmaceutical contained within the ribbon. Such means may also be used to move or advance the ribbon products through manufacturing and the several dispensing operations.

A presentation head may be incorporated into the conduit, cassette or cartridge for serially presenting or separating each reel ribbon segment. In response to the input from the controller based on a prescription, the presentation head will actively or passively be advanced to feed the ribbon into the automated dispensing device so that the each ribbon segment and its contents would be presented for dispensing in a way where after the dispensing a first ribbon segment, the next ribbon segment will be advanced to the dispensing position and available for a dispensing head. Such a presentation head may have a reader for reading the encoded data on each ribbon segment and that may be identified with human and machine readable elements such that a head can be directly and uniquely associated with a specific reel or cartridge so that the head's identity data defines the pharmaceutical that is dispensed.

In another aspect of the invention, an apparatus is provided that is in communication with at least one computer network and is capable of accepting prescriptions electronically from authorized devices in communication with said network. The apparatus comprises at least one pharmaceutical storage structure with plurality of storage locations that are capable of accepting a plurality of reel cartridges, cassettes or conduits each containing a different pharmaceutical or the same pharmaceutical with different unit doses. The apparatus also comprises a means for accessing and comparing patient medical data stored on the associated computer network against prescribed drugs to prevent improper administration of drugs and adverse drug reactions. The apparatus further comprises dispensing structure having a reader for reading encoded data on ribbon cartridges and segment and that is capable of locating storage locations and dispensing prescribed pharmaceuticals. The apparatus also comprises a printing means for printing encoded data on a container that can be read by a reader and representing patient information, drug and dose information.

Another aspect of the invention provides for high density storage and dispensing systems for pharmaceutics that requires fewer manual processes for stocking and restocking. The system has dense and uniform packaging, and no requirement for individual receptacles for each unit dose, eliminating complicated means of accessing individual storage areas that contain a very limited quantity of medications The storage systems have a small physical foot print in comparison with known systems having the same capacity.

In one aspect of the invention methods are disclosed for providing unit dose pharmaceutical packaging for high efficiency transportation, tracking, storage, and distribution and dispensing to patients.

In another aspect of the current invention an apparatus is provided for a personal automated pharmaceutical dispenser for individual use that include security, ease of operation and a number of user friendly features.

BRIEF DESCRIPTION OF THE DRAWINGS

Embodiments of the present disclosure will be more readily understood by reference to the following figures, in which like reference numbers and designations indicate like elements.

FIG. 11 depicts a front, top down and profile view of a single cassette for a home dispenser.

DETAILED DESCRIPTION OF THE PREFERRED EMBODIMENTS

Figure 1A:
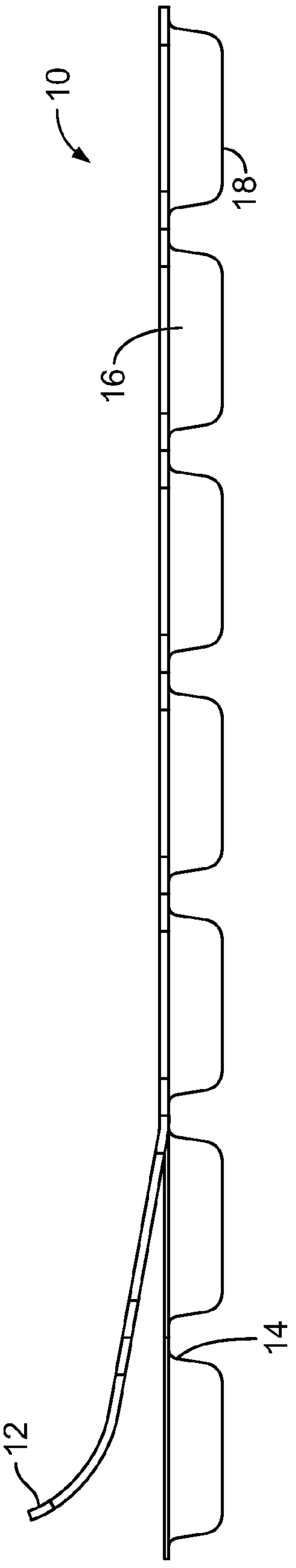
FIG. 1A is a profile view of one embodiment of one aspect of the invention showing a section of the ribbon or tape with segments and cavities with the removable covering.

The present invention provides for a high efficiency automated pharmaceutical packaging and dispensing system for hospital, pharmacy, residential and home healthcare facilities. The present invention will now be described more fully with reference to the accompanying drawings, which shows the preferred embodiments of the invention. This invention may, however, be embodied in many different forms and should not be construed as limited to the illustrated embodiments disclosed. Rather, these embodiments are provided so that this disclosure will be thorough and complete, and will fully convey the scope of the invention to those skilled in the art. Like numbers refer to like elements throughout. The preferred embodiments of the current invention and methods will now be described in detail, with reference made to FIGS. 1-16.

Referring now to the drawings, where the showings are for purposes of illustrating the preferred embodiments of the invention-only and not for purposes of limiting the same.

FIG. 1A is a side profile representation of the high-density packaging ribbon segment, or unit dose package (UDP) 10 for pharmaceutical unit doses processed in a high efficiency automated pharmaceutical dispensing systems. The ribbon could also be a band or tape suitable as a packaging material. The ribbon of the preferred embodiment is linear; however, it is contemplated that the ribbon may be multidimensional and composed of multiple columns and row. Pharmaceuticals are packaged in a ribbon of packaging material of a desirable width. The ribbon can be of essentially any width and length depending on the dispensing application and the pharmaceutical contained within the ribbon. The ribbon 10 is comprised of a flat layer 12 and a cavity layer 14 sealed together along a single length of all sided of the cavity, sufficient to keep the medication contain within the cavity or if preferred air tight, using any appropriate means such as a strong adhesive. The cavity layer may simply be a shrink wrap material that provides sufficient space or volume for the unit dose of the medication being packaged in this specific ribbon. The ribbon comprises a plurality of individual segments 16, each with a cavity 18 for holding individual unit doses of a pharmaceutical or individual container such as a bottle, vile or syringe containing such pharmaceutical. Each ribbon segment is sequentially positioned on the ribbon so that there is only one dose or cavity per segment within the width of the ribbon package for each segment unit length, but multiple essentially identical segment lengths sequentially and uniformly spaced on the ribbon. The individual segments may be completely sealed or have intentional holes such as in the bottom of the cell to allow for pressure variation, circulation of air, or to assist in the dispensing process by allowing access to the pill or to advance the ribbon to the next segment. It is also contemplated that for ointments or a topical the ribbon may be comprised of a series of individual pouches, similar to ketchup pouches which are strung on a single ribbon length. To use the same ribbon and reel strategy for personal dispensers, it is possible to have a master dispenser feed medication into a second ribbon and reel container directly at the time of prescription filling so that a custom ribbon is created with serially sequential dosages of various drugs are placed in a length of ribbon for dispensing at a home or care facility by a device that is intended for a single patient.

Figure 1B:
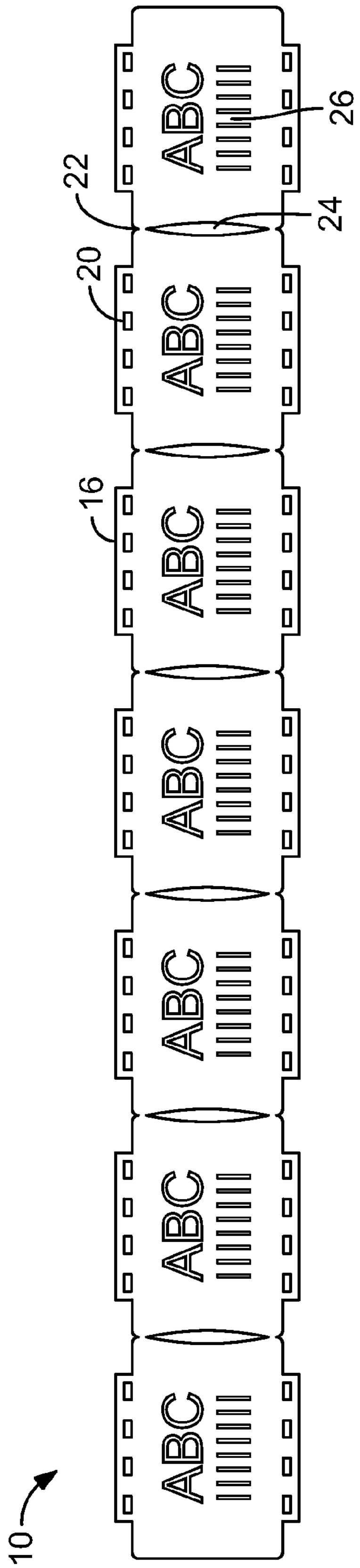
FIG. 1B is a top view of the tape with segments and cavities and removable covering.

FIG. 1B is a top down view of the flat layer 12 of the ribbon 10. Each ribbon segment 16 may have sprocket holes 20 or notches 22 or other similar physical features such as embossments on either or both linear edges to that are used as register points and that allow the ribbon to be pulled or drawn from a reel to advance each ribbon segment 16 through the system. Such means may also be used to move or advance the ribbon products through manufacturing or filling and sealing and the several dispensing operations. These notches 22 can be located symmetrically at some distance from the leading edge of the segment so that either end of the ribbon can be the leading end or the notches can be offset or tapered so that only one end of the ribbon can be the leading end and the other the trailing end, the ribbon advancing in only one direction. The ribbon 10 may include perforations 24 or cut and removed space between each segment 16 that extend the width of the ribbon and allow for easy separation of segments.

Figure 1C:
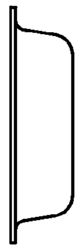
FIG. 1C is a profile view of a single unit dose after being dispensed and removed from the ribbon.

On each segment 16 of the ribbon 10 information 26 is included that may be human or machine readable. The information 26 can represent any information relevant to the particular pharmaceutical, such as name, dose, manufacturer date and lot code, or unit identification of the individual segment on the ribbon reel location. Each side of individual ribbon sections may contain encoded data indicative of relevant information. The data can be essentially any type of data and it can be encoded in a variety of know means, including single or multidimensional bar code. The data can be read as the ribbon segment passes over a reader to compare against the script to assure the proper medication is provided. FIG. 1C is a front view of an individual ribbon segment.

Figure 2A:
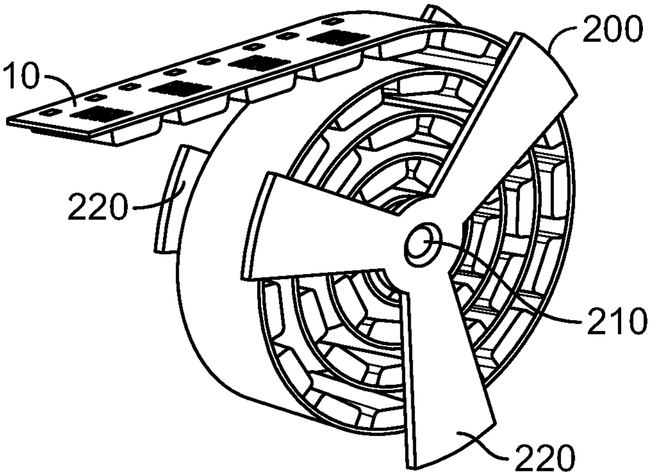
FIG. 2A is a front view schematic representation of a length of continuous ribbon containing unit doses on a minimal carrier comprised of a central core and sufficient side supports to keep the tape manageable when handled outside of a dispenser or other restraint.
Figure 2B:
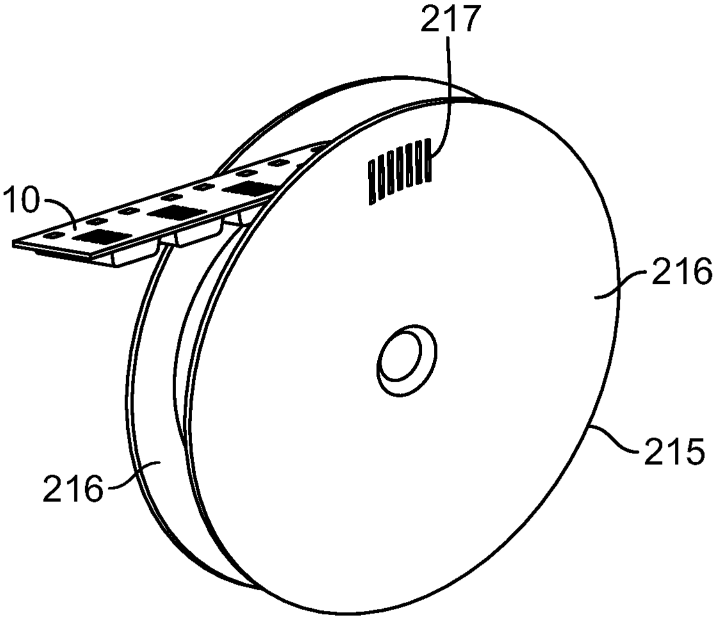
FIG. 2B is a front view schematic representation of a length of continuous ribbon containing unit doses on a core supported and protected by circular sides.
Figure 2C:
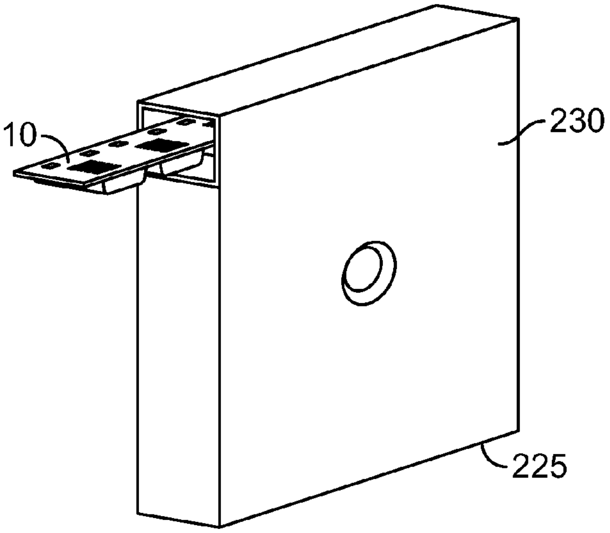
FIG. 2C is a front view schematic representation of a carrier which may provide a stand-alone dispensing method, a shipping container, or a structurally independent and uniform cassette that is inserted into a dispenser for automated dispensing.

The ribbon with individual unit doses packaged within each ribbon segments is further packaged for use in the system. The ribbon packaging allows for the automation and uniform transport, tracking, storage and dispensing in a highly efficient manner. Now with reference to FIG. 2A, the ribbon 10 is wound about a reel 200 with a center core 210 that allows for the placement of the reel on a sprocket. The reel 200 that may incorporate generally circular side supports 220 of such size and configuration as to create an overall package with integrity onto which a desirable ribbon length of prepackaged individual unit doses of drugs can be wound. FIG. 2B is an alternative embodiment showing a ribbon 10 wound about a reel 215 with full circular side supports 216. The benefit of the full side support is the greater strength of the overall package and the added surface area for display of greater quantities of printed information 217. FIG. 2C shows a ribbon 10 wound about a reel (not shown) contained in cassette or cartridge 225 for easy warehousing, transportation, storage and placement within the dispensing system. The cartridge 225 is preferable in hospital and pharmaceutical applications to increase storage capacity, prevent contamination, and to make restocking of the system more efficient. The cartridge 225 is formed from ridged support panels 230 made from any suitable material and that fully enclose the reel. It is also contemplated that standardized packaging may also be a container or box into which a fan-folded ribbon may be placed.

Figure 2D:
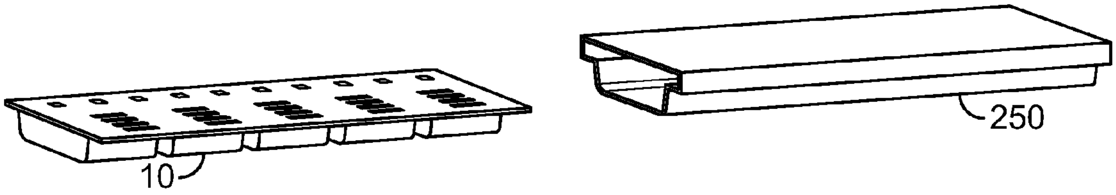
FIG. 2D is a schematic representation of a length of unit dose ribbon of comparable quantity to a blister pack sheet of unit doses. Also shown is an embodiment of a tube into which a length of unit dose ribbon can be placed.

FIG. 2D presents another alternative embodiment of the ribbon packaging 10 that is preferable in smaller applications such as a home health care environment or for personal dispensers, allowing for smaller quantities and thus greater varieties, (more SKU numbers). Each length of ribbon 10 would approximate the number of UDP's on a blister card, and thus the minimum order quantity (MOQ) that a hospital would receive in an order. One of the benefits of this design is the dramatic reduction, if not elimination, of an inventory area outside of the dispenser. With the enhanced density and reduction of manual labor required to 'singulate' UPD's from their parent blister cards, as well as not having to consume time filling loading trays from which a robot picks up UPD's to place into a dispenser, incoming pharmaceutical inventories can be placed directly into the invention in any available location.

Figure 2E:
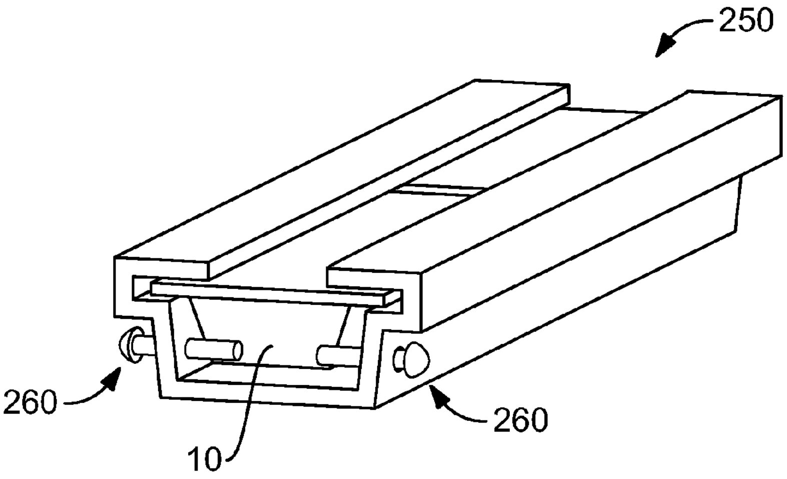
FIG. 2E is a schematic view of the end of a tube with unit dose packages inserted and mechanical means of both restraining and permitting the advancement of a unit dose out of the end of the tube.

Now with reference to FIGS. 2D and 2E, each ribbon 10 is cut into smaller strip lengths of a set number of unit dose ribbon segments 16 that may be fed into a tube 250 or similar conduit restraint system. The tube 250 shown in FIG. 2D and FIG. 2E conforms to the general shape of the ribbon's leading edge front profile, which allows for convenient insertion into the dispenser. FIG. 2E shows the ribbon 10 inserted packaged in the tube 250. The tube 250 may contain ribbon stop restraints 260, which are engaged by the dispenser to allow the ribbon to advance and prevent the ribbon 10 from slipping from the tube 250.

Figure 3B:
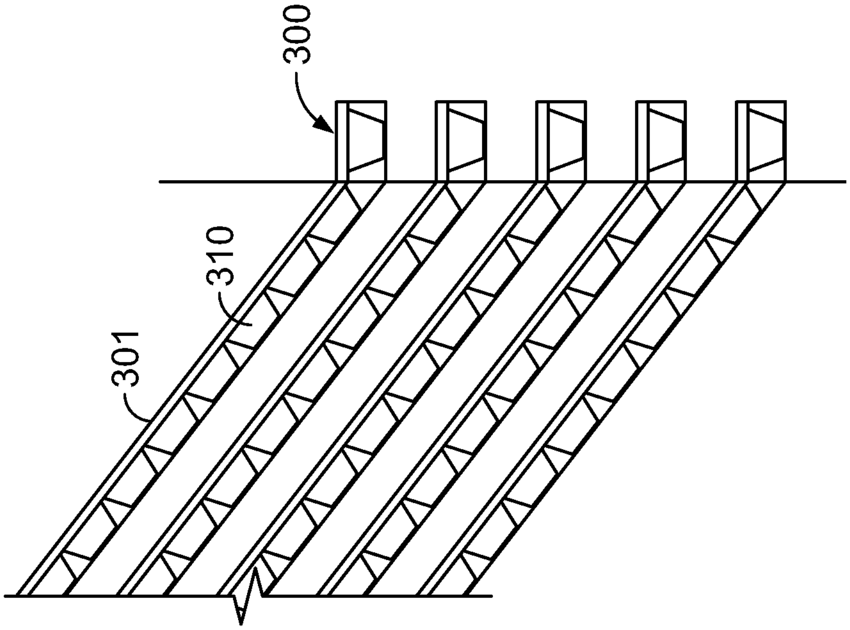
FIG. 3B is a schematic representation of a portion of a dispenser with tubes being used rather than reels. The tubes are shown at an angle to the presentation head to demonstrate the advantage of the flexible ribbon packaging and how the density of the presentation heads is independent of the density of the storage media.
Figure 3A:
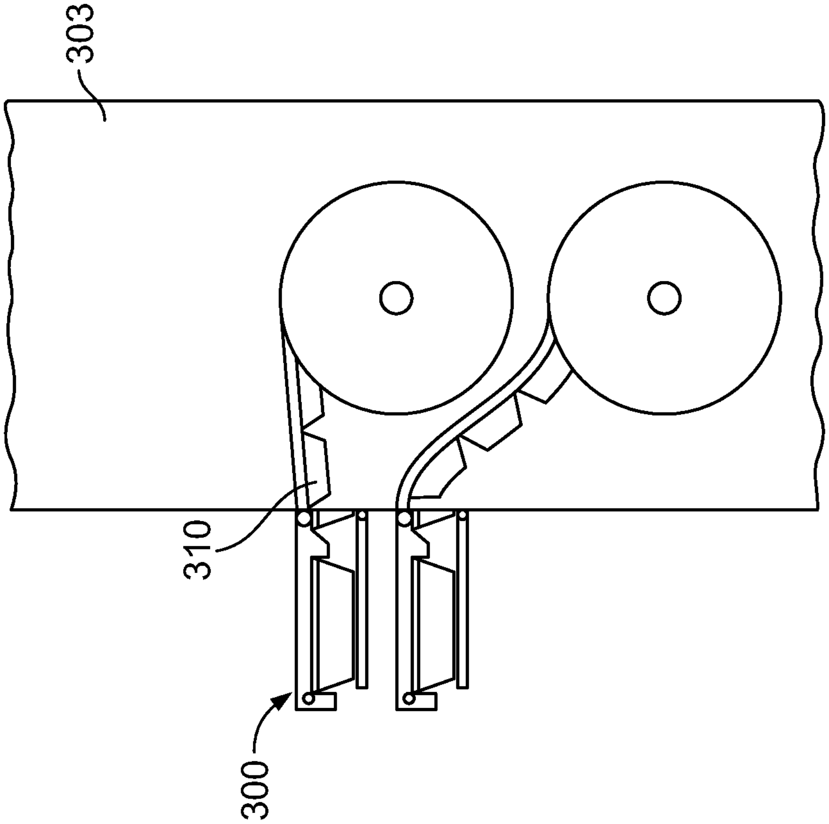
FIG. 3A is a schematic representation of a portion of a dispenser showing 2 reels of unit dose medications being presented at individual locations where the dispensing locations are closer together than the respective dimensions of each reel; also shown is an embodiment of presentation heads with a single unit dose presented according to the present teachings.
Figure 4A:
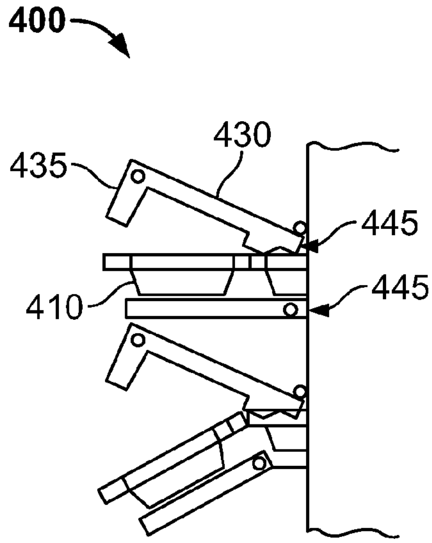
FIG. 4A is a front view representation of a unit dose package at the presentation point being constrained by a pair of front stops.
Figure 4B:
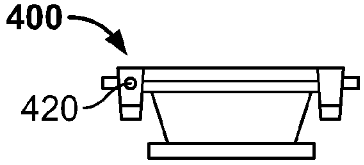
FIG. 4B is a side view of a unit dose package at the presentation point with the upper constraint lifted to allow the unit dose package to be pulled forward by the dispensing head, and a modified embodiment showing the lower presentation platform tilted down on pivot to allow increased access to the unit dose package for dispensing and electronic reading of indicia.
Figure 4C:
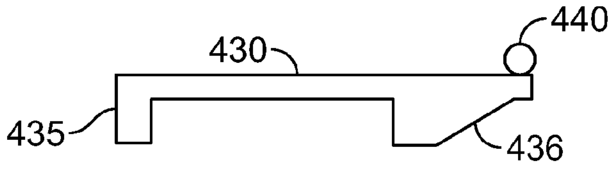
FIG. 4C is a schematic view of a presentation head without a unit dose package present.
Figure 4D:
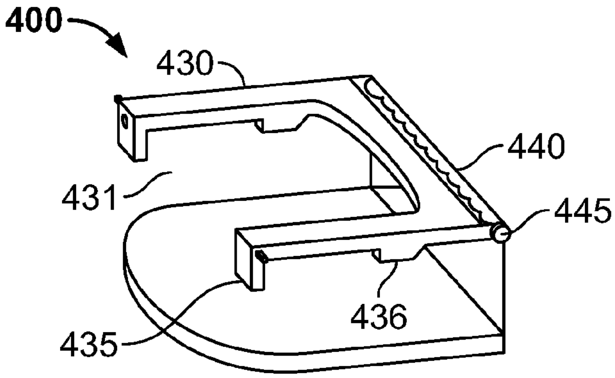
FIG. 4D is a side view of the mechanical restraint of a presentation head showing the forward restraints.

Referring now to FIGS. 3A, and 3B, a presentation head 300 may be incorporated into the conduit 301, reel, cassette or cartridge 303 for serially presenting or separating each reel ribbon segment 310. One skilled in the art will appreciate that a number of alternative designs can be engineered for achieving the same objective of storing, advancing and presenting the ribbon. FIGS. 4A, 4B, 4C, and 4D show different views of the presentation head. The presentation head 400 will feed or position each ribbon segment 410 into the automated dispensing device so that the each ribbon segment and its contents would be presented for dispensing in a way where after the dispensing a first ribbon segment, the next ribbon segment will be advanced to the dispensing position and available for a dispensing head. The dispensing head 400 may incorporate an optical target or alignment sensor 420 at its leading end for ensuring the proper alignment of a picking head (not show).

The upper arm portion 430 of the dispensing head preferably has a central open space 431 that allows a reader to have visibility access of the ribbon as it proceeds through the presenting head into the dispenser head. The presentation head 400 may be associated with a reader (not shown) for reading the encoded data on each ribbon segment which may be identified with human and machine readable elements such that a dispensing head can be directly and uniquely associated with a specific reel or cartridge so that the head's identity data defines the pharmaceutical that is dispensed. The reader reads data from the ribbon surface and communicates this data to the system.

The upper arm 430 preferably hinged at the rear and contains a spring 440 or other mechanically created load at a hinged location 445 to keep the upper arm 430 in a closed position unless the ribbon segment is pulled through the head. A front register 435 and a back registers 436 will limit the advancement or prevent backward movement of the ribbon as it is pull through the dispensing head by closing on the register notch located between each ribbon segment. As the ribbon is pulled through the dispensing head the upper arm 430 raises until a register notch is reach and the spring 440 tension forces the upper arm 430 to close at the register notch.

Figure 5:
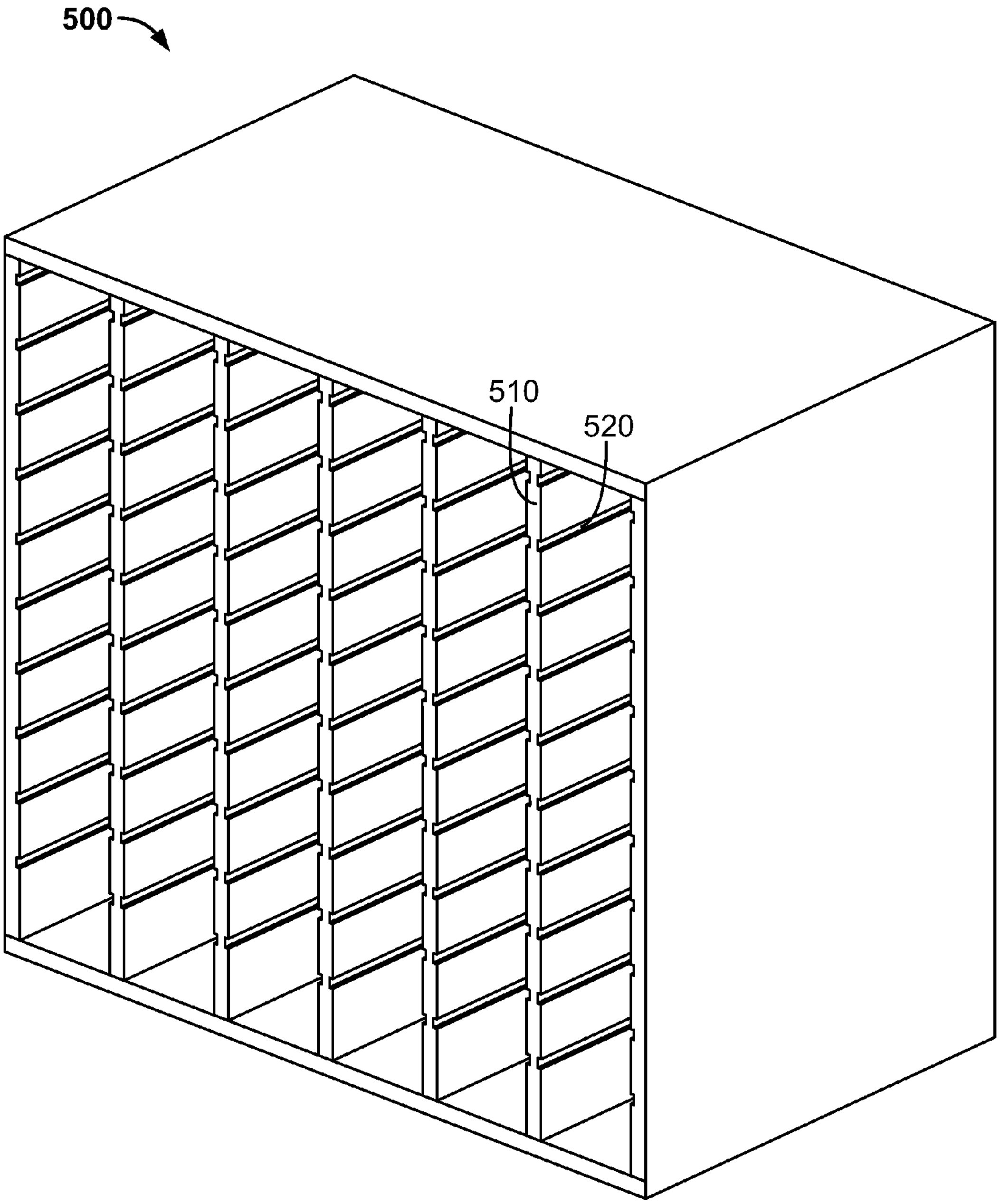
FIG. 5 is a schematic view of the back of a cabinet typical of a hospital pharmacy application where appropriate lengths of UPD ribbons are contained in tubes, or loaded directly into slots.

Now referring to FIG. 5, the system includes a dispensing cabinet 500. The cabinet can be of any shape and size, but is preferably structured to accommodate the particular application and environment where the system is used. In one embodiment shown is FIG. 5, the cabinet 500 is a seventy two inch by thirty six inch box enclosed on the top, bottom and sides. The cabinet has a series of dividers 510 running vertically and spaced 1.5 inches apart. Each divider 510 has a plurality of grooves 520 on each side of the divider and spaced 1.5 inches. This configuration provides for 1,152 slotted locations. If each slot will have a location address and is loaded with ribbons containing twenty four segments the total contents of the cabinet will be 27,648. However, if a reel containing a ribbon with two hundred segments is used the total content can be increased to 230,400 unit doses. Thus the storage density advantage of the ribbon and reel configuration is apparent.

Figure 6:
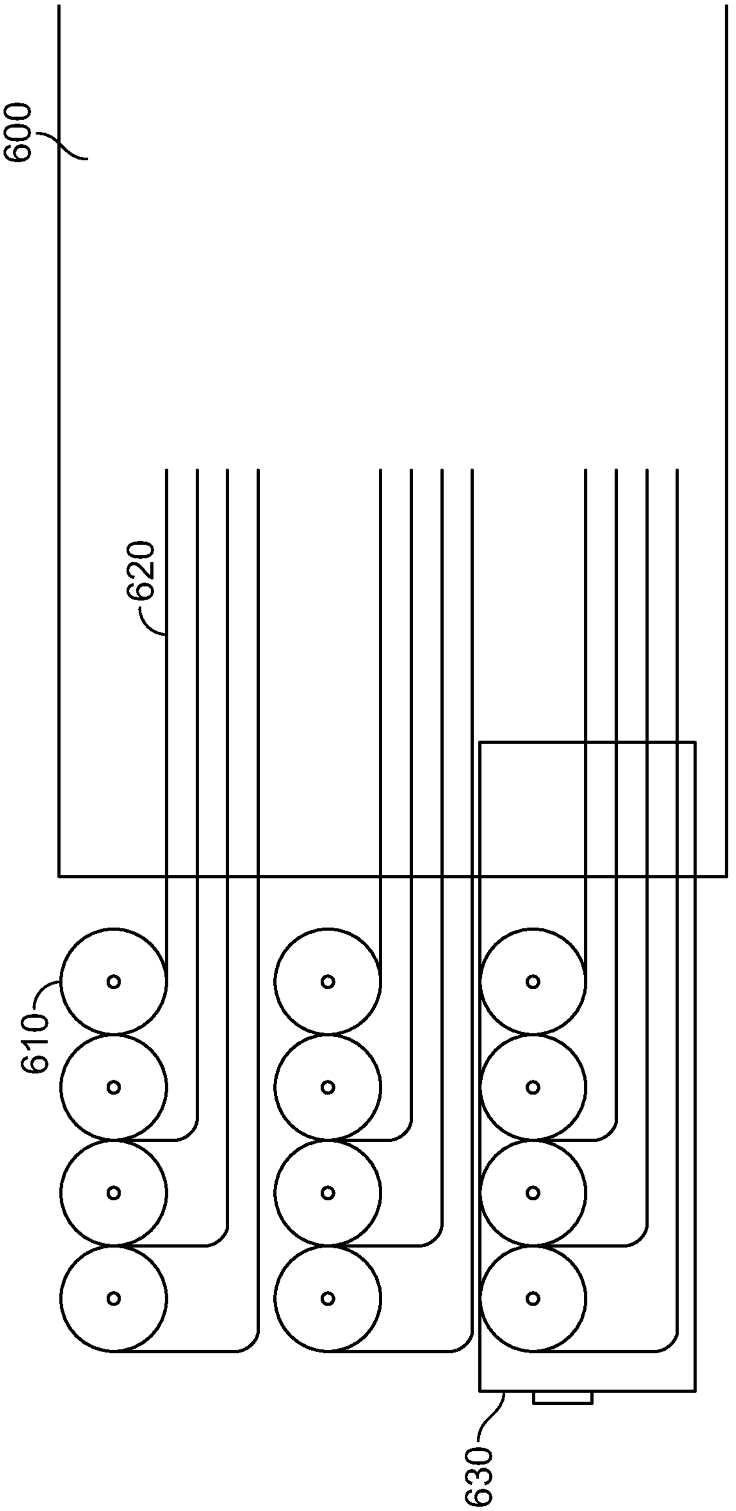
FIG. 6 represents a profile view of a mechanical system of UPD ribbons rolled onto reels being stored and dispensed in a high density system.

FIG. 6 demonstrates one configuration for installing multiple reels 610 into the cabinet 600. Each reel 610 is placed in a slot conforming to the size of the reel. Multiple reel slots are structured in a drawer 630 that can be pulled open to replace a reel. The ribbon of each reel is fed through feed slots 620 within the cabinet.

Figure 7B:
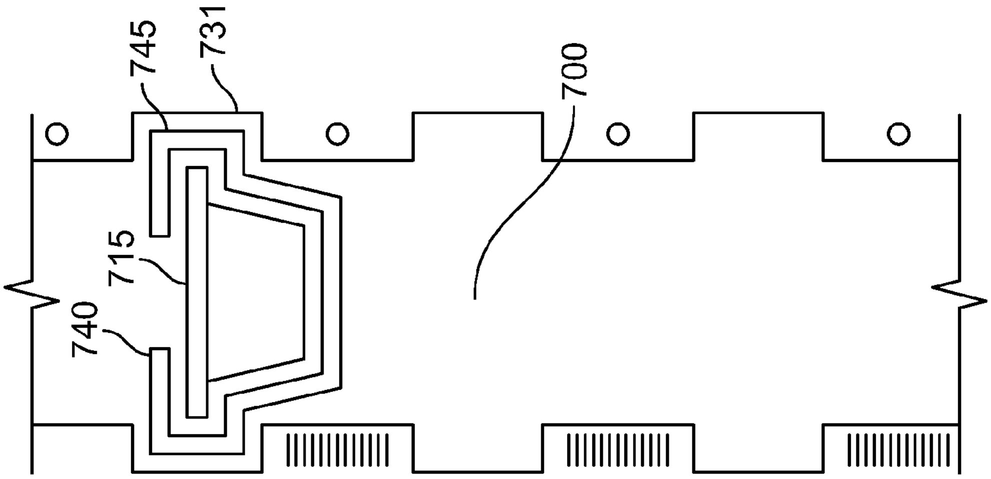
FIG. 7 represents a view of a portion of the back of the cabinet of FIG. 5 with lengths of UDP ribbons either in tubes or independent of tubes in position to be dispensed.
Figure 7A:
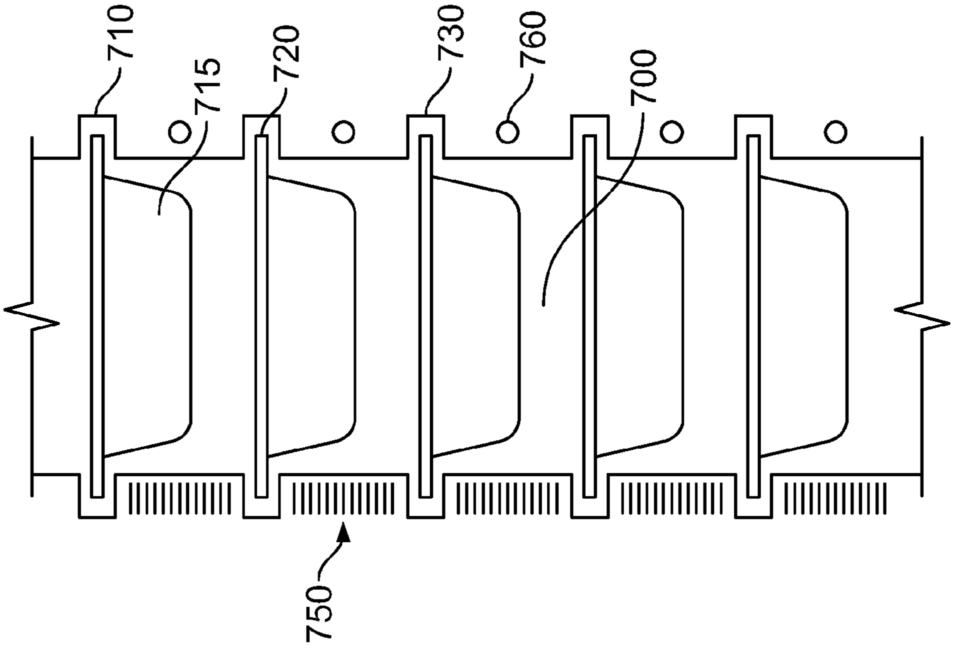

FIG. 7 shows the slots configuration of one column within the cabinet 700. Referring to 7A, in an embodiment where ribbons 715 are fed directly though the vertical slot 710. Lateral extensions 720 fit into grooves 730 of the slots. Each slot location is provided an address or coordinate that allows for identification of the location. The address data can be represented as bar code or other data associated 750 with the slot location or associated with a sensor that is triggered when inserting a ribbon. Additionally, a user may input other data such as drug type, dose, quantity, etc. An indicator light 760 is also provided at each slot location, which is illuminated when restocking.

Now, referring to 7B, in an embodiment where a conduit or tube 740 holds the ribbon 715, the conduit is formed to include lateral extensions 745 that fit into grooves 731 of the slots. A clip or other means such as a door, pin, slide is used for preventing the conduit from slipping from the slot.

Figure 8:
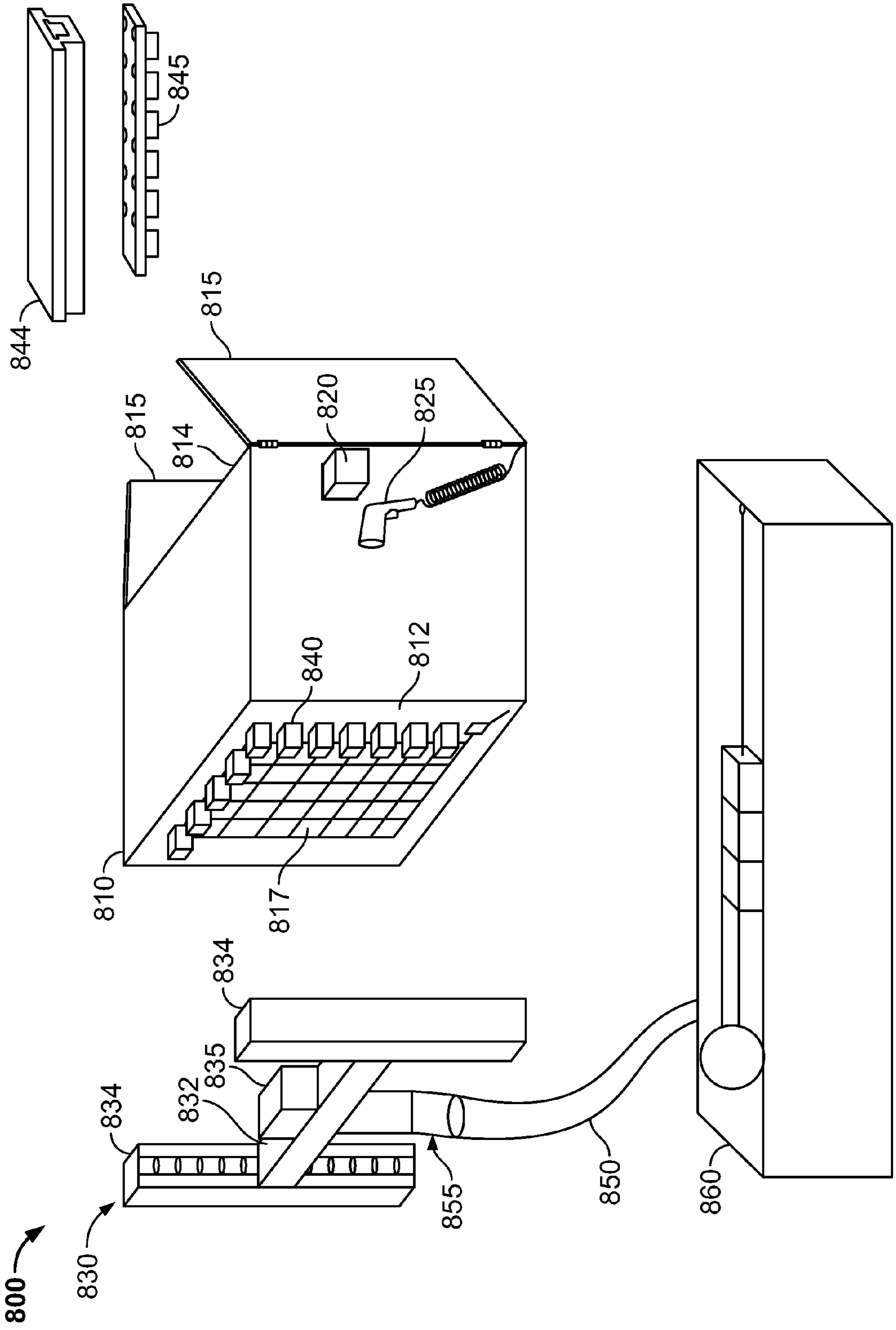
FIG. 8: Represents one embodiment of a complete system with the various components of the system.

Now referring to FIG. 8, illustrated is the overall configuration of the preferred embodiment of the system 800. The system is comprised of storage cabinet 810 having a dispensing face 812 and an inventory loading face 814. Doors 815 are provided for securing inventory internal to the cabinet and for gaining access to a plurality of conduit slots 817 running the length through the cabinet 810. A plurality of presentation heads 840 extend from the slots 817 on the dispensing face side 812 of the cabinet. For illustration purpose only, not every slot 817 of FIG. 8 includes a presentation head.

The cabinet will have a user interface 820, which one of skill in the art will appreciate could include many conventional known types of interfaces and may include a keyboard, display, wired or wireless communications interface with other devices. In the preferred embodiment the user interface 820 is microcontroller based and controlled by a software application. The user interface 820 allows users to access the various functions and reports of the system. Additionally, the user interface 820 may be connected to a modem or other wired or wireless communications interface (not show) that will provide communications with a computer network or the Internet (also not shown) and will allow for remote access to, data exchange with and control of the system.

The system 800 includes a data reader 825. In the preferred embodiment the reader 825 is a single or multi-dimensional bar code reader that allows users to scan data from individual conduits 844 packaged with ribbons 845 of unit doses prior to insertion into the cabinet slot 817. The data reader 825 can also be used to read data on individual unit dose packages or at each individual slot location 817. By reading data from the conduit 844 and slot location 817 at the time of stocking inventory into the system the system can track the location of pharmaceuticals of various doses and verify and cross check against patient data or drug interaction data when filling a prescription to ensure there are no errors in drug type or dose. The captured data can also be used to generate a large variety of reports, for inventory management and for system access monitoring.

A dispensing head support frame 830 is interfaced with the cabinet 810 and provides a rigid structure for moving the dispensing head 835 in the X and Y coordinates. The dispensing head support frame 830 includes two upright beams 834 and a cross beam 832, which adds support and provides for a mounting location for the dispensing head 835. The cross beam 832 can be raised and lowered on the Y axis using a mechanical motor means within the upright supports such as a motor driving a belt, drive shaft, linkage system or similar system. The dispensing head 835 can be moved along the X axis using a similar means within the cross beam 832. There are many know means for mechanically moving a load along the X and Y axis. It will be appreciated by one skilled in the art that any of these means can be used to move the dispensing head along the X and Y axis.

When the dispensing head support frame 830 is mounted to the cabinet 810, the dispensing head 835 is movable along the X and Y axes and as it moves from one slot location to the next will interface with the presentation heads 840 located at a plurality of slot location within the storage cabinet 810. The dispensing head 835 will be mapped to the proper slot location based on a grid address system and software that is loaded into a system microcontroller within the user interface, ensuring that proper location is located and unit dose packages are picked. As the system accepts a prescription from authorized users, which can be digitally communicated to the system via linked computer network. The system can cross check against patient records to verify that the unit dose is appropriate for the particular patient's physical data and condition. The system also can use a look up table to make sure there will be no adverse drug interactions based on the patient's current prescriptions.

855 shows a temporary collection device for collecting all the doses required to fill a specific prescription for a single patient. This allows the dispensing head 835 to travel to all required drug locations in the system to dispense the required medications for a single patient before returning to a home or discharge position. 850 is a conduit for receiving the doses from the collection tube 855 and transferring them to a distribution sorting device 860 where each patient's completed prescription is placed in a unique container where a printer print a label and the container will be transported to the patient for administering.

Briefly described, this process includes the picking head 835 being moved to each presentation head 840 required and picking a UPD for each medication required. These UPD's are held in the temporary collection device 855 which is attached to 835 as it moves until the picking process for a single patient is completed. The dispensing head 835 then moves to a position approximate to 850 into which 855 transfers the UPD's to complete the patient prescription. 860 then advances a new pocket opening which is labeled appropriately and into which the UPD's are placed. The pocket is then unsealed. In a hospital scenario, the dispenser is programmed to pick the medications according to the delivery order in which they will be administered. By creating a continuous strip or bandolier of labeled and sealed pouches connected and perforated between in the order in which they will be distributed, accuracy, security and savings of space is achieved.

Figure 9:
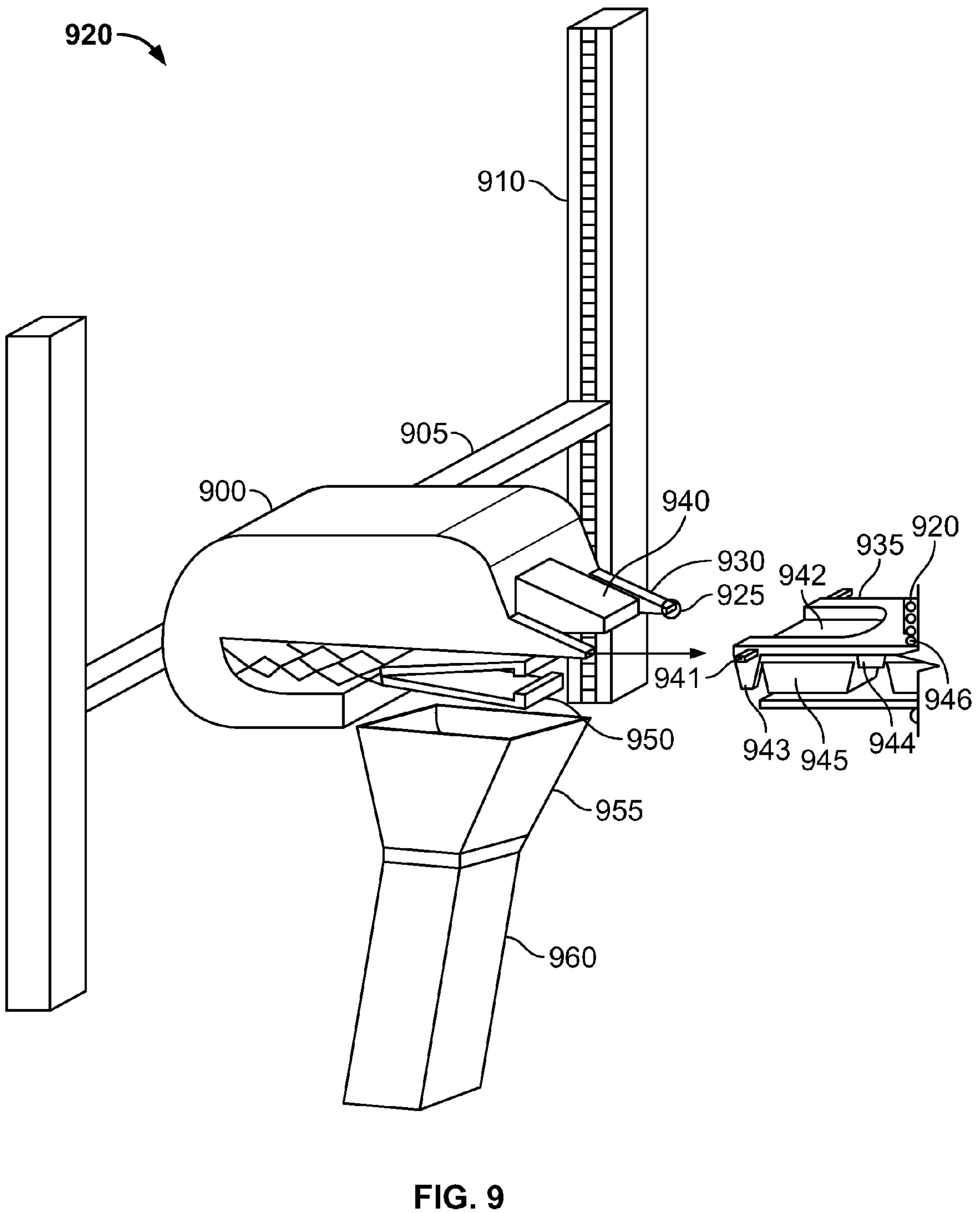
FIG. 9 is one embodiment of the dispensing head aspect of the present invention of a dispensing head.

Referring now to FIG. 9, the dispensing head 900 is mounted to the dispensing head support frame cross beam 905. Head 900 is moved in the Y direction on upright beams 910 and the X direction on cross beam 905. Once in the proper XY position to access a presentation head according to the prescription, the dispensing head slides into position in the Z direction with the presentation head 920 and an optical sensor 925 detecting a mark or target on the presentation head 920 to allow for proper alignment of the presentation head 920 and the dispensing head 900. A presentation head opener 930 having a wedged shape slides under the opening pins 941 on upper arm portions 935 of the presentation head and lifts the upper arm against the spring tension at the hinge as the dispenser head move forward. A reader 940 moves over the open portion of the upper arm and scans the data 942 on the ribbon segment 945 made available for dispensing, confirming the type of drug, dose, segment number, and other relevant information. A cutter 950 grabs, extracts, cuts and separates the ribbon segment 945, which drops into a collector 955 having an attached chute 960. A front register 943 prevents multiple ribbon segments from advancing and a back register 944 prevents the ribbon from retracting. As the dispensing head 900 retreats from the presentation head 920 the upper arm 935 will move to the closed position as a result of tension caused by the hinge spring 946.

Again referring to FIG. 8, once the ribbon segment has been separated from the ribbon it falls through a chute 850 attached to the dispensing head collector 855 to a packaging table 860 where the prescription is prepared for delivery to the patients. Within the packaging table 860 will be a bagger for placing individual ribbon segment unit doses for a specified prescription. The bagger may be on a roll, each bag drawn for each prescription. A printer a bar code label and seals it to the bag to properly identify the contents and associated with the proper prescription. A conveyor delivers the packaged script to a collection area.

Figure 10:
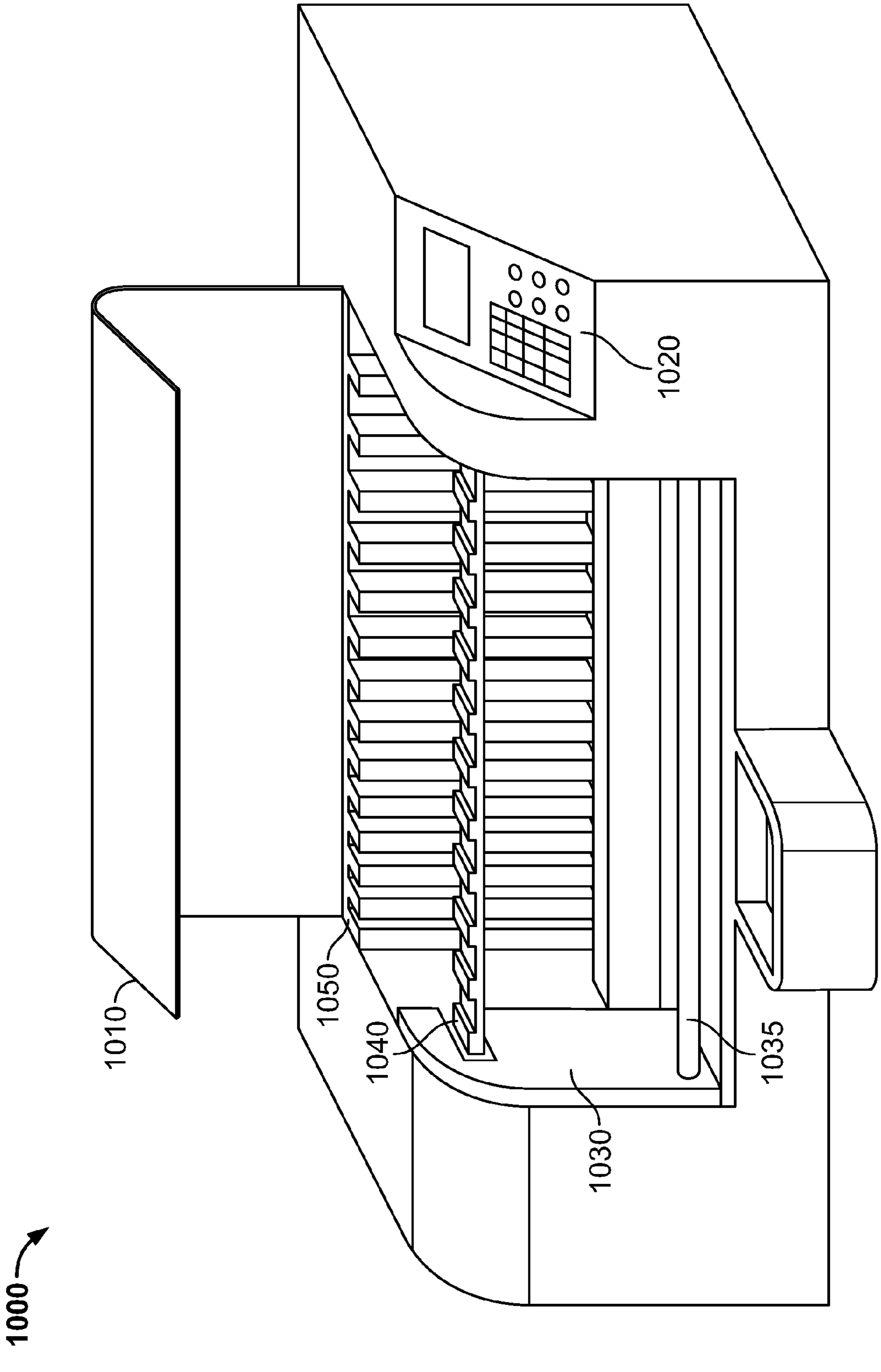
FIG. 10 depicts a front view of an embodiment of a home or personal dispenser.

It will be understood by those skilled in the art that the system may be configurable with a variety of different such cabinet types, pick and pack mechanisms and packaging processes. For example a tower or column with multiple bin locations around the circumference of the tower and multiple stacked layers rotating on a carousel for easy presentation of the presentation head to a picking head. Another configuration may have multiple towers surrounding a single dispensing head. Yet another configuration may be a personal and small venue application. FIG. 10 shows such a configuration.

With reference to FIG. 10, an embodiment for a personal pharmaceutical dispenser 1000 is provided. The personal configuration has the same components of the hospital version, including the door 1010, a user interface 1020, a dispensing head 1030, presentation heads 1040, and medication slot positions 1050. The process is essentially the same as in the larger hospital application without the requirement of any Y movement. The dispensing head 1030 moves by a drive shaft 1035 and aligns with the presentation head 1040 for extracting, cutting and separating the ribbon segment unit doses.

Now with reference to FIGS. 11A, 11B and 11C. Depicted are multiple views of a single cassette 1110 for a home dispenser. FIG. 11A is a top down view showing the single cassette 1110, which may be made of cardboard, pressboard, plastic or other suitable materials. A label 1120 is provided to show the contents of the cassette 1110. A similar label 1130 is provided on the tape.

FIG. 11B is a front view of a cassette 1110 showing the leading edge of tape leader 1160 extending through opening 1150. UPD cavity 1170 is shown as it will pass through opening 1150. The label 1140 may contain information regarding the contents of 1110 in a different location that is still visible when the cassette 1110 is placed in the home dispenser.

FIG. 11C is a cut-away view of cassette 1110. The cassette 1110 provides the enclosure to restrain a length of tape 1165 containing enough medication of a single type for a period of time, typically up to 31 doses for daily use for an entire month. A larger cassette could be used to contain sufficient UDP's for multiple doses per day or a longer period of time. 1110 also provides the structure and protection required for transporting, mailing, handling and dispensing the UDP's from the reel contained therein, although for confidentiality and security this cassette may be placed in an envelope or other carrier. The cassette 1110 may be refillable, recyclable or disposable.

A label 1120 is affixed to the cassette 1110 at or prior to the filling of the cassette 1110 with the ribbon 1165. The label 1120 has either or both human and machine readable information regarding the contents of the cassette 1110, including but not limited to the drug type, name, UDC, patient, time of day to be administered, quantity, physical characteristics, routing, filling and manufacturing information. In general, the label 1120 contains the information read by dispenser at the time of installation and at the time of dispensing for quality control and gathering dispensing information. The label 1130 contains information pertaining to the contents of reel 1165 and is on a leader length of tape prior to the first UDP in cassette 1110. During the prescription filling sequence, the ribbon 1165 is cut from a larger master roll. At this time it is advantageous to label the otherwise unidentified length of tape as to its origin and destination. Even though each individual UDP pocket may be labeled as to its contents (FIG. 1B, 60), additional information such as patient specific information for whom the prescription is being filled is practical to act similar to a 'router' in a manufacturing production line and as a means of identifying each individual prescription along the fulfillment path in creating a 'chain of custody' verification. This label 1130 can also have an adhesive on the back and provide a level of security and tamper resistance by ensuring that one or more doses have not been surreptitiously cut from the tape length 1165 during handling.

The tape length 1165 may be wrapped around a core 1166 with or without reel support sides 1167, or spiraled without a core, fan-folded or otherwise configured within 1110.

Figure 12:
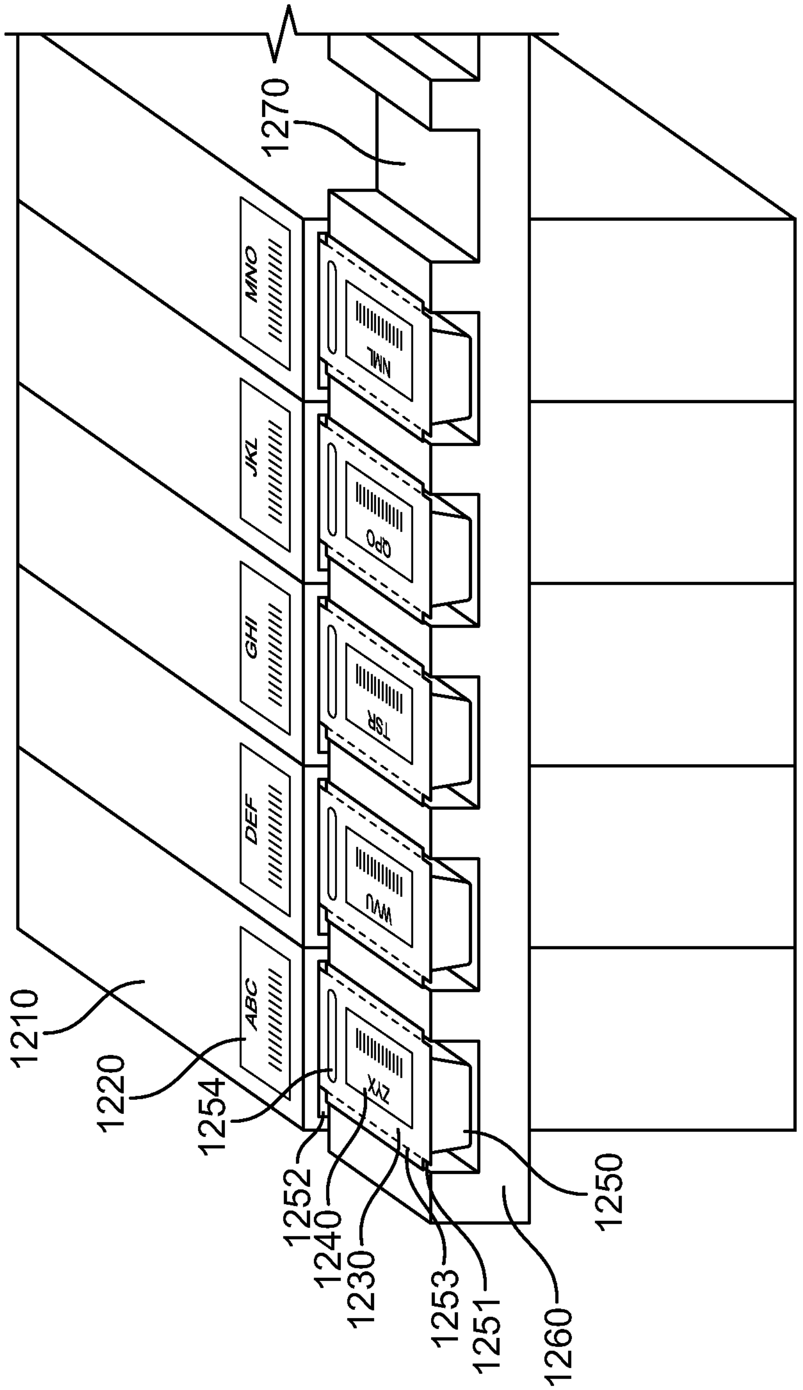
FIG. 12 shows a section of the home dispenser stationary presentation head frame without showing the surrounding structure of the dispenser in which it is located.

FIG. 12 shows a section of the home dispenser's stationary presentation head frame 1260, without showing the surrounding structure of the dispenser. Individual presentation heads 1270 are designed and configured so as to accept UDPs 1250 in a manner that the UDP 1250 is supported, registered and held in place for the dispensing process so that the label 1240 on the ribbon's cover 1230 is exposed prior to being detached from the tape length. Cassettes 1210 are shown as placed in the dispenser in any order, sequence or location so that labels 1220 can be read during the programming and dispensing processes. Each unit dose package 1250 is held from moving forward and maintained in dispensing position by detail 1251 registering in the head 1270. Combined use of forward advancement registration detail 1252 and drive engagement detail 1253 during the dispensing process advances pocket 1250 beyond the head 1270 and positions the next UDP 1250 on tape length 1165 in the presentation head 1270 and the first (dispensed) pocket 1250 is able to be separated from tape length 1165 at and assisted by connecting detail 1254. During the dispensing process, label 1240 is read by the dispensing head to verify proper medication information.

Figure 13:
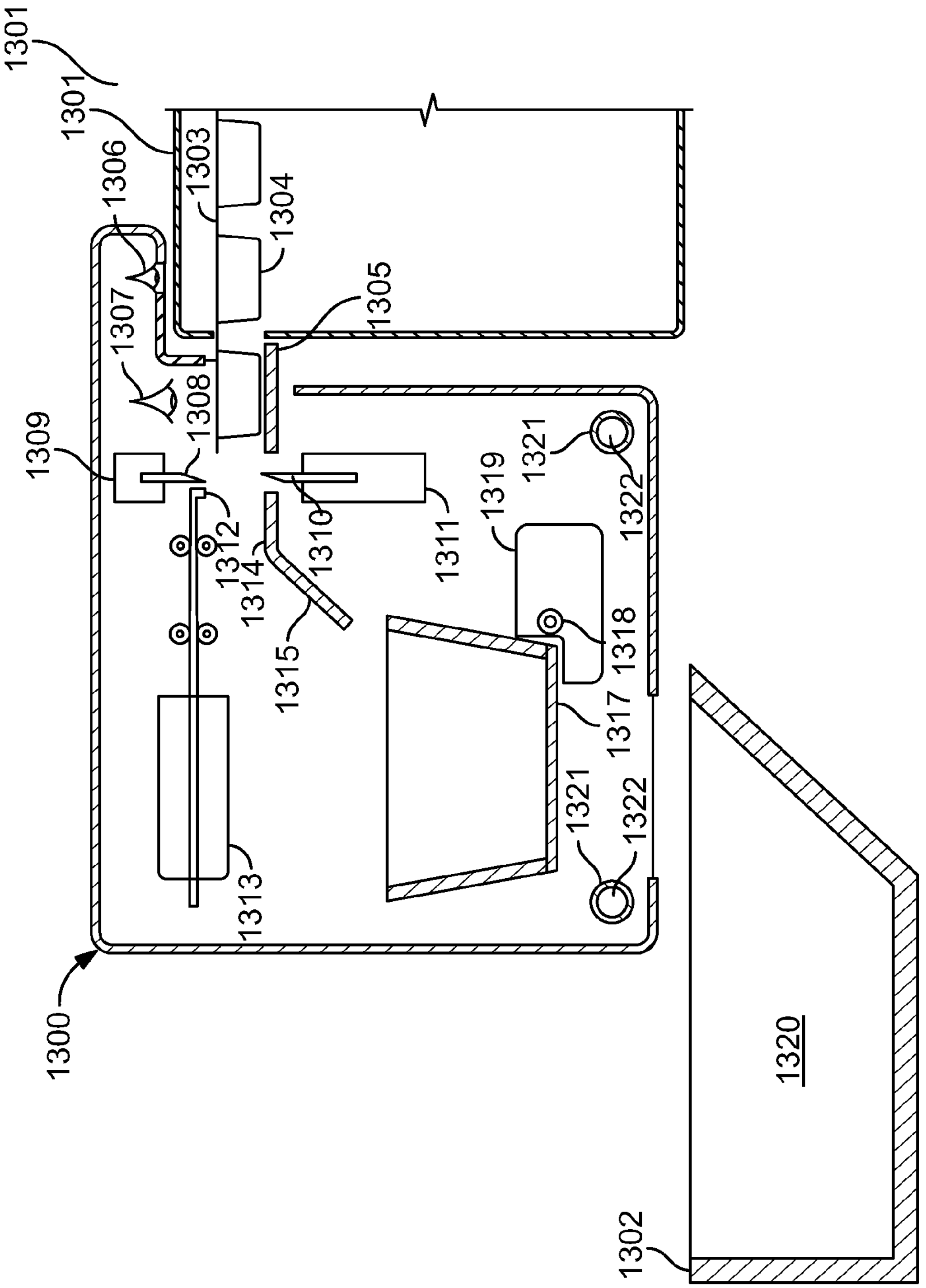
FIG. 13 is a cross sectional view of the dispensing head for the home dispenser.
Figure 14A:
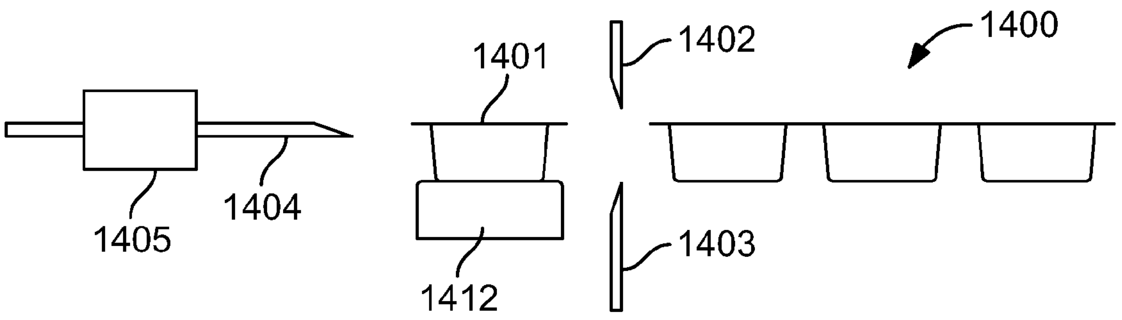
FIG. 14 is an alternative embodiment of the home dispenser dispensing mechanism.
Figure 14B:
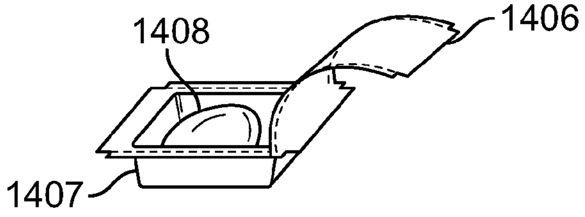
Figure 14C:
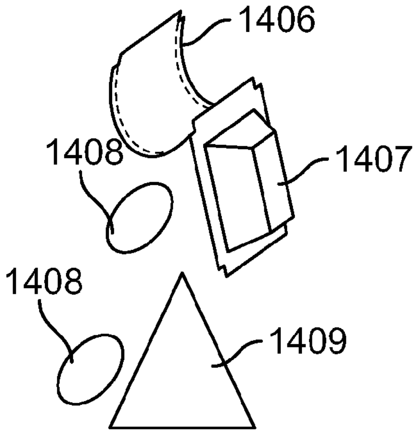
Figure 14D:
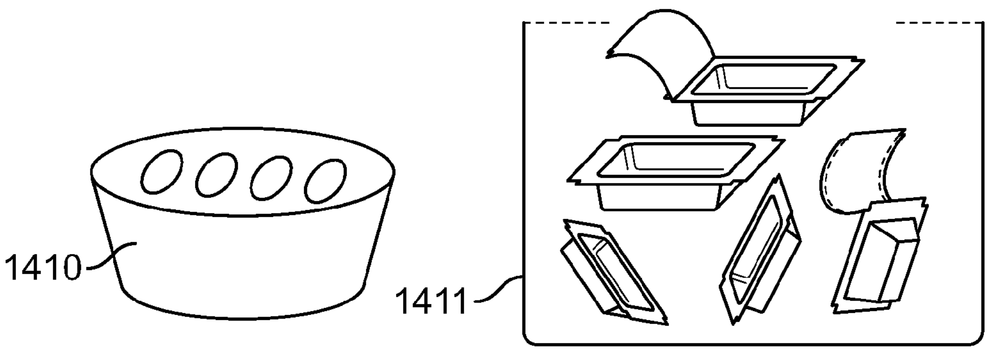

FIG. 13 is a cross sectional view of the dispensing head 1300 of the home dispenser. The dispensing head 1300 moves along guide rods 1322 on bearings 1321 to the proper position aligned with dispenser carrier cassette 1301. The alignment with the proper cassette is verified by optical reader 1306 reading a label on the cassette 1301. The optical reader 1307 verifies and records a label on the UDP before UDP advance arm 1312 is extended by controller 1313 to engage and slide pocket 1304 from presentation head 1305 to the temporary staging area 1314. At this time, upper and lower blades 1308, 1310 are controlled by blade drives 1309 and 1311 to sever the connection between the ribbon segments. The dispensed UDP segments now slides down collection guide 1315 into temporary collection cup 1316 where it resides with other dispensed UDP segments until all doses are dispensed for the current dispensing time.

After all doses are similarly dispensed, the dispensing head 1300 returns to its home position in dispenser. A cup bottom 1317 is released by control 1319 on hinge 1318 and the contents of UDP's are delivered into stationary collection tray 1320 where the patient or his care giver can access them in the area assessable to the patient.

Now with reference to FIGS. 14A, 14B, 14C and 14D, FIG. 14A shows an alternative embodiment for dispensing the required medications. In this alternative, the UDP's are opened and the medications separated and collected in a common area with the packaging being collected for further processing such as disposal, compacting, recycling. The purpose is to provide medications ready for consumption without requiring that the patient open individual unit dose packaging. This method is more in line with the current methods of opening a container that contains a month's supply of bulk or unwrapped dosages.

The doses are packaged and delivered in the same manner as described above to the point of dispensing. During dispensing as described in FIG. 13, the unit dose 1401 is cut from the ribbon 1400 by blades 1402 and 1403 and held on temporary staging area 1412. An opening cutter 1404 is extended by controller 1405 to pierce and separate the leading and side edges of UDP cover 1406 from UDP cavity 1407. Once opened, the UDP segment 1401 is still held by staging 1412 and rotated to allow opened segment 1408 to fall to one side of separator 1409 and into collection area 1410 while empty UDP cavity 1407 and cover 1408 are deposited to the other side of separator 1409 from where they are retrieved and further processed. Both collection area 1410 and disposal collection area 1411 may be attached to dispensing head 1300 and their contents deposited into accessible areas such as stationary collection tray 1302 as described above.

Figure 15:
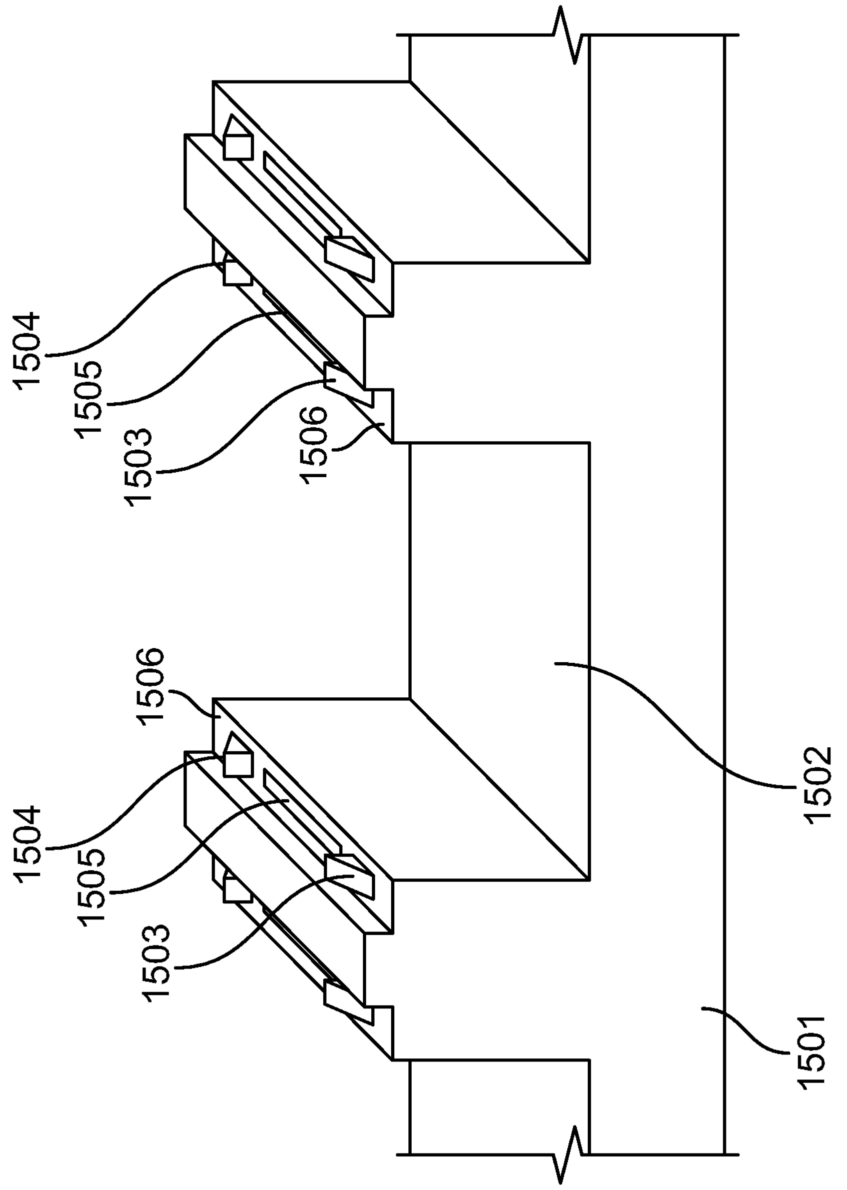
FIG. 15 is a representation of an embodiment having a single presentation head in a presentation head frame.

Now referring to FIG. 15, shown is a representation of an embodiment of a single presentation head 1502 in presentation head frame 1501. The forward advancement limit 1503 protrudes above UPD flange support 1506 in a manner that it is able to catch in the forward advancement limit of the UDP and register the UDP in the proper position for dispensing. The forward advance limit 1503 is spring loaded so that it is capable of being pushed flush with 1506 during the dispensing operation, typically by the UDP advance bar. Similarly 1504 is spring loaded so that it retracts into the flange support 1506 as the ribbon is drawn forward and lifts back into position as the forward advancement limit detail of the UDP moves beyond reverse limit 1504. 1505 is a relief feature that enables 1312 or other such mechanism clear access to the sprocket holes in the ribbon length.

Figure 16:
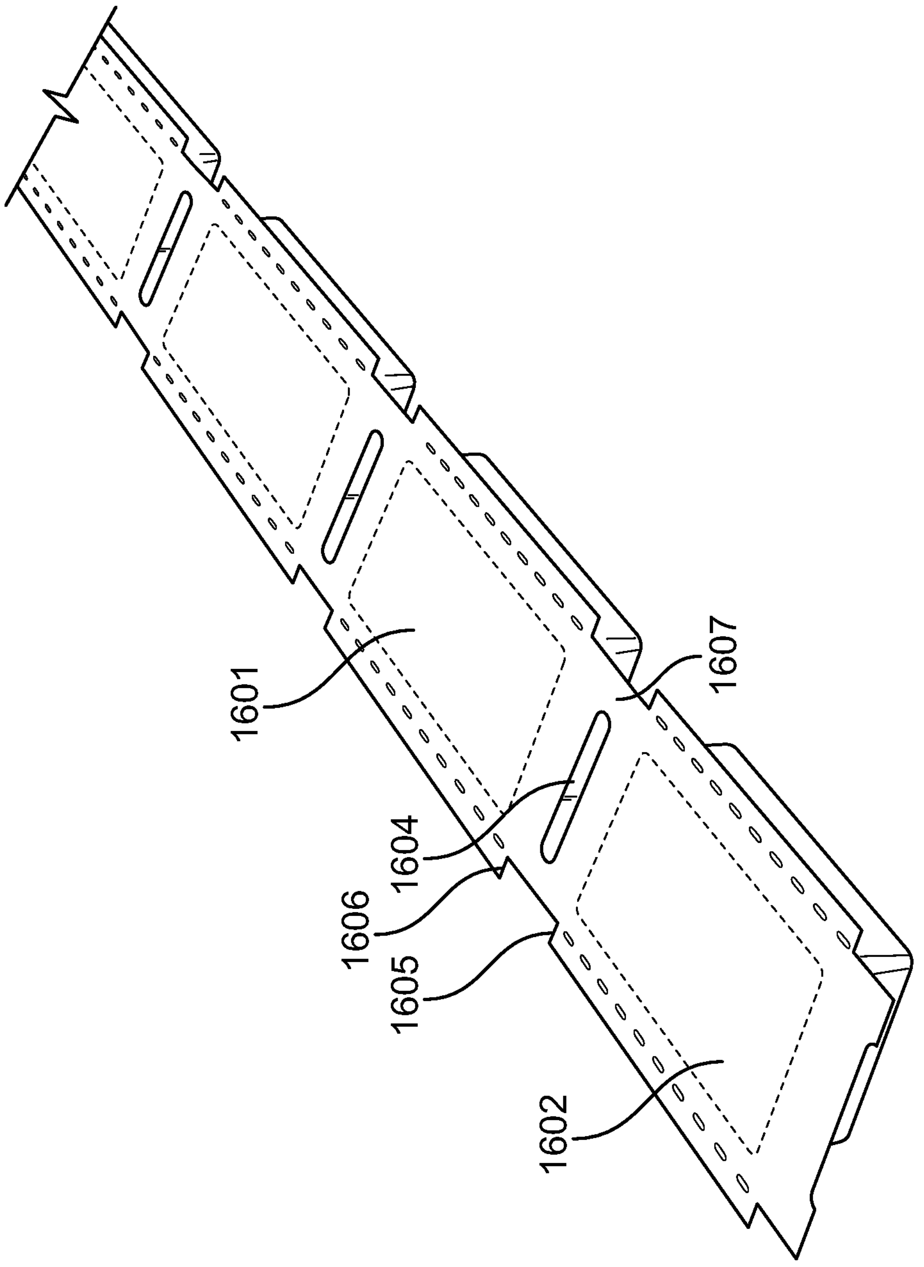
FIG. 16 is a detail of a length of tape of unit dose packages as contained in a dispenser cassette.

Now referring to FIG. 16, shown is a length of ribbon 1601 of unit dose package segments 1602 as contained in a dispenser cassette. 1603 is the pocket portion of the lower tape containing the medication dose. 1604 is an open area removed from the ribbon for easier separation of contiguous cavities at the time of dispensing. 1605 is the forward advancement register which engages with the forward advance limit 1504 to keep a UDP in the dispenser head from retreating back into the cassette. A reverse advancement registration 1506 is shown which engages with reverse limit 1503 in the presentation head. 1607 is the remaining structure of the ribbon that connects one UDP segment with the next UDP segment.

While the above description has pointed out novel features of the present disclosure as applied to various embodiments, the skilled person will understand that various omissions, substitutions, permutations, and changes in the form and details of the present teachings may be made without departing from the scope of the present teachings.

Each practical and novel combination of the elements and alternatives described hereinabove, and each practical combination of equivalents to such elements, is contemplated as an embodiment of the present teachings. Because many more element combinations are contemplated as embodiments of the present teachings than can reasonably be explicitly enumerated herein, the scope of the present teachings is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art.

What is claimed is:

1. A pharmaceutical dispensing system, comprising:

at least one packaging ribbon having a plurality of serially-connected containment packages within which to carry respective ones of a plurality of pharmaceutical unit doses, each of said containment packages containing readable information concerning the unit dose carried therein;

a pharmaceutical dispensing cabinet having a pharmaceutical dispensing face and a plurality of ribbon storage compartments, said at least one packaging ribbon being received within one of said plurality of ribbon storage compartments;

at least one presentation head interfaced with said pharmaceutical dispensing cabinet at the pharmaceutical dispensing face thereof and including at least one retaining arm, said retaining arm being movable between a closed position to engage said packaging ribbon and thereby prevent a displacement of said packaging ribbon relative to said ribbon storage compartment, and an open position, to be disengaged from said packaging ribbon and permit a displacement of said packaging ribbon;

a dispensing head lying in proximity to the pharmaceutical dispensing face of said dispensing cabinet in order to selectively access the at least one packaging ribbon received within the one of said plurality of ribbon storage compartments of said dispensing cabinet, said dispensing head having a presentation head opener moving into momentary contact with the at least one retaining arm of the at least one presentation head to cause said retaining arm to move from the closed position to the open position whereby to be disengaged from said packaging ribbon, said dispensing head also having engaging means to engage and extract said packaging ribbon from said ribbon storage compartment when said retaining arm is in said open position, such that the leading one of said plurality of serially-connected containment packages of said packaging ribbon is located in front of the pharmaceutical dispensing face of said pharmaceutical dispensing cabinet; and a cutter to cut off the leading one of said plurality of serially-connected packages of said packaging ribbon.

2. The combination recited in claim 1, wherein the at least one retaining arm of the at least one presentation head cooperates with a spring by which said retaining arm is urged to move towards said closed position at which to engage said at least one packaging ribbon to prevent a displacement thereof.

3. The combination recited in claim 1, wherein the at least one retaining arm of the at least one presentation head includes a register projecting therefrom by which to engage and retain said at least one packaging ribbon so as to prevent a displacement thereof when said retaining arm is moved to said closed position.

4. The combination recited in claim 1, wherein the at least one retaining arm of the at least one presentation head has an opening pin extending therefrom, the presentation head opener of said dispensing head moving into said momentary contact with said opening pin for correspondingly causing said retaining arm to move from said closed position to said open position.

5. The combination recited in claim 1, further comprising a dispensing head support frame interfaced with said pharmaceutical dispensing cabinet and coupled to said dispensing head to enable said dispensing head to move in first and second perpendicular-aligned directions relative to the pharmaceutical dispensing face of said pharmaceutical dispensing cabinet, said support frame including a pair of vertical beams spaced from one another and a cross beam extending therebetween and moving in a first of said perpendicular-aligned directions relative to said vertical beams, said dispensing head being carried by said cross beam and moving therealong in the second of said perpendicular-aligned directions, and the presentation head opener of said dispensing head moving in a third direction towards the at least one retaining arm of the at least one presentation head for causing said retaining arm to temporarily move from the closed position to the open position, said third direction being aligned perpendicular to said first and second perpendicular-aligned directions.

6. The combination recited in claim 1, wherein the at least one retaining arm of the at least one presentation head has an open area through which to permit visual access to the readable information contained by the plurality of serially-connected containment packages of said at least one packaging ribbon.

7. The combination recited in claim 6, further comprising a reader positioned relative to the at least one retaining arm of the at least one presentation head to read the information contained by the leading one of said plurality of serially-connected containment packages of said at least one packaging ribbon through the open area of said retaining arm.

8. The combination recited in claim 7, further comprising a user interface communicating with said reader to permit a user to enter pharmaceutical dose information to be compared with the information contained by the leading one of said plurality of serially-connected containment packages and read by said reader.

9. The combination recited in claim 1, wherein said at least one packaging ribbon has a series of openings formed therein and running therealong, the engaging means of said dispensing head engaging and applying a pulling force to said packaging ribbon at said openings thereof.

10. A pharmaceutical dispensing system, comprising:

at least one pharmaceutical carrier having a plurality of serially-connected containment packages within which to carry respective ones of a plurality of pharmaceutical unit doses;

pharmaceutical dispensing means having a pharmaceutical dispensing face, a pharmaceutical loading face, and a plurality of storage compartments running between said loading and dispensing faces, said at least one pharmaceutical carrier being received within one of said plurality of storage compartments by way of one of the loading face or the dispensing face of said dispensing means;

at least one pharmaceutical carrier retaining means interfaced with said pharmaceutical dispensing means at the pharmaceutical dispensing face thereof and including an upper arm and a lower arm, said at least one pharmaceutical carrier being supported by said lower arm in front of said pharmaceutical dispensing face and said upper arm being movable between a closed position, lying in engagement with and retaining said pharmaceutical carrier between said upper and lower arms to prevent a displacement of said carrier relative to said one storage compartment, and an open position, spaced from and releasing said pharmaceutical carrier to permit a displacement of said pharmaceutical carrier;

opening means being movable relative to the pharmaceutical dispensing face of said pharmaceutical dispensing means, said opening means moving into momentary contact with the upper arm of said at least one pharmaceutical carrier retaining means for causing said upper arm to move from the closed position to the open position at which to release said pharmaceutical carrier;

engaging means to engage and extract said at least one pharmaceutical carrier from said at least one storage compartment when said upper arm is in the open position such that the leading one of said plurality of serially-connected containment packages of said pharmaceutical carrier is located in front of the pharmaceutical dispensing face of said pharmaceutical dispensing means; and cutting means to cut off the leading one of said plurality of serially-connected containment packages of said pharmaceutical carrier when said opening means moves out of its momentary contact with the upper arm of said pharmaceutical carrier retaining means, whereby said upper arm moves back to said closed position at which to retain said pharmaceutical carrier.

11. A pharmaceutical dispensing system, comprising:

a presentation head including a frame, a channel recessed within said frame, and a pair of spring-biased packaging ribbon advancement limits located on said frame at respective opposite sides of said channel, said packaging ribbon advancement limits being movable between a locking position projecting upwardly from said presentation head frame to an unlocking position in response to a downward pushing force applied thereto so as to be located within and lie flush with said presentation head frame;

a packaging ribbon having a plurality of engagement openings running therealong and a plurality of serially-connected containment packages within which to carry a corresponding plurality of pharmaceutical dose units, said packaging ribbon being coupled to said presentation head such that said serially-connected containment packages thereof are received within the recessed channel of said presentation head frame and the presentation head packaging ribbon advancement limits are received through some of said plurality of engagement openings when said advancement limits are in the locking position at which to engage and prevent a displacement of said packaging ribbon relative to said presentation head frame, said packaging ribbon advancement limits being pushed to the unlocking position at which to be disengaged from and permit a displacement of said packaging ribbon relative to said presentation head frame so that at least some of said plurality of serially-connected containment packages slide through said presentation head channel and outwardly from said presentation head frame; and a cutter to cut off from said packaging ribbon at least one of the containment packages thereof that slide outwardly from said presentation head frame.

* * * * *